United States Patent
Liao et al.

(10) Patent No.: US 12,019,211 B2
(45) Date of Patent: Jun. 25, 2024

(54) OPTICAL IMAGING LENS

(71) Applicant: Genius Electronic Optical (Xiamen) Co., Ltd., Fujian (CN)

(72) Inventors: Huabin Liao, Fujian (CN); Hai Lin, Fujian (CN); Wei-Jeh Kao, Taichung (TW); Chuanbo Dong, Fujian (CN); Hung-Chien Hsieh, Taichung (TW)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 555 days.

(21) Appl. No.: 17/211,840

(22) Filed: Mar. 25, 2021

(65) Prior Publication Data
US 2022/0252835 A1 Aug. 11, 2022

(30) Foreign Application Priority Data
Feb. 5, 2021 (CN) .......................... 202110159600.2

(51) Int. Cl.
*G02B 13/00* (2006.01)
*G02B 13/18* (2006.01)
*G02B 27/00* (2006.01)

(52) U.S. Cl.
CPC .......... *G02B 13/004* (2013.01); *G02B 13/18* (2013.01); *G02B 27/0025* (2013.01)

(58) Field of Classification Search
CPC ........ G02B 9/34; G02B 13/004; G02B 13/18; G02B 27/0025; G02B 13/00; G02B 23/24; G02B 25/001; G02B 15/1445; G02B 13/04; G02B 25/04
USPC ....... 359/644, 643, 660, 684, 715, 747, 771, 359/781
See application file for complete search history.

(56) References Cited

U.S. PATENT DOCUMENTS

2008/0266678 A1 10/2008 Tang

FOREIGN PATENT DOCUMENTS

| CN | 102486571 A | | 6/2012 | |
|---|---|---|---|---|
| CN | 109613678 A | | 4/2019 | |
| CN | 110703420 A | * | 1/2020 | ............... G02B 1/00 |
| CN | 112255778 A | * | 1/2021 | ......... G02B 23/2407 |
| CN | 112255778 A | | 1/2021 | |

* cited by examiner

*Primary Examiner* — Stephone B Allen
*Assistant Examiner* — Daniel Jeffery Jordan
(74) *Attorney, Agent, or Firm* — Winston Hsu

(57) ABSTRACT

An optical imaging lens includes a first lens element, a second lens, a third lens element and a fourth lens element from an object side to an image side in order along an optical axis. An optical axis region of the object-side surface of the first lens element is convex, and an optical axis region of the image-side surface of the third lens element is concave. The lens elements included by the optical imaging lens are only the four lens elements described above. Tavg is an average of four thicknesses from the first lens element to the fourth lens element along the optical axis, an Abbe number of the first lens element is υ1, and an Abbe number of the second lens element is υ2 so that the optical imaging lens satisfies: Tavg≤300 μm, and |υ1−υ2|≤30.000.

19 Claims, 43 Drawing Sheets

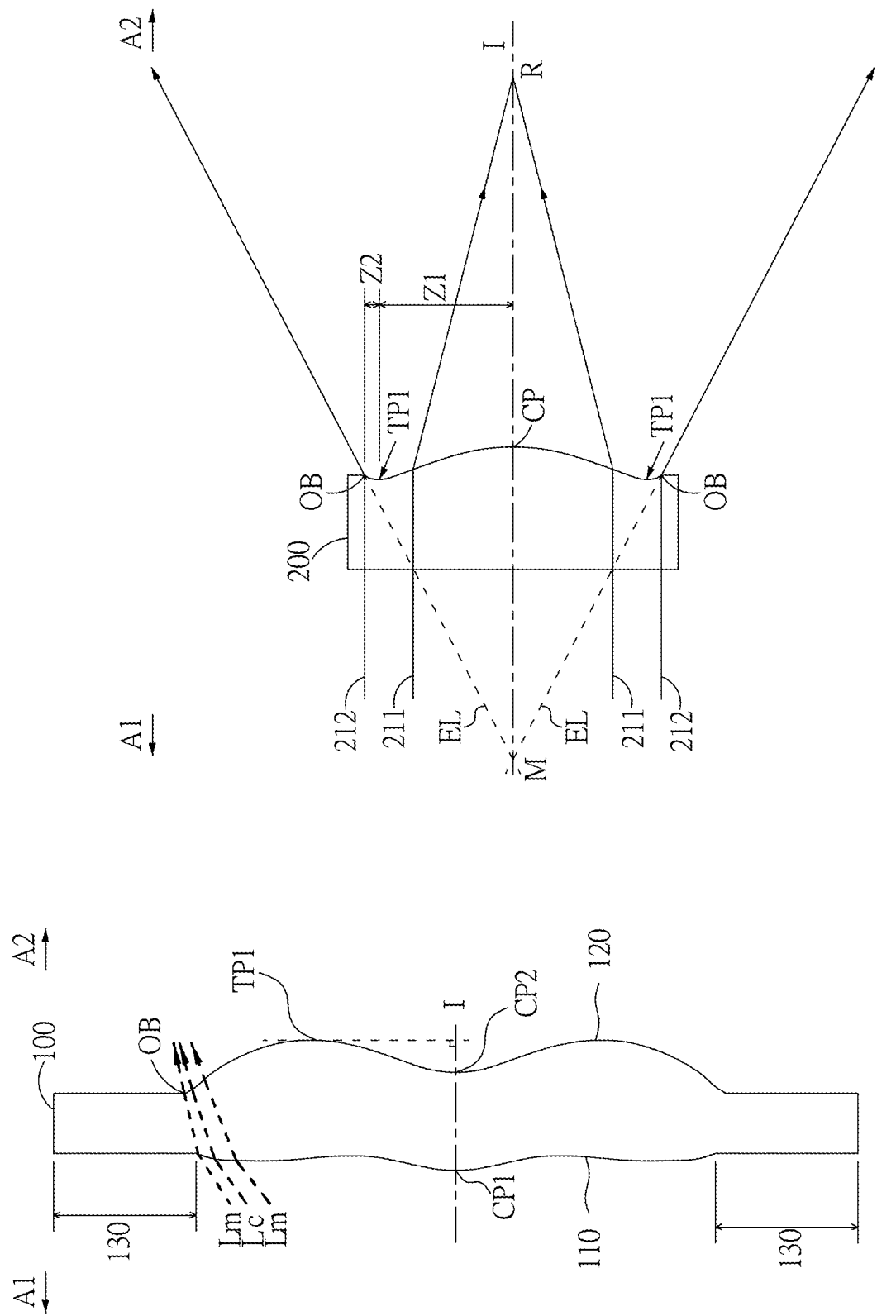

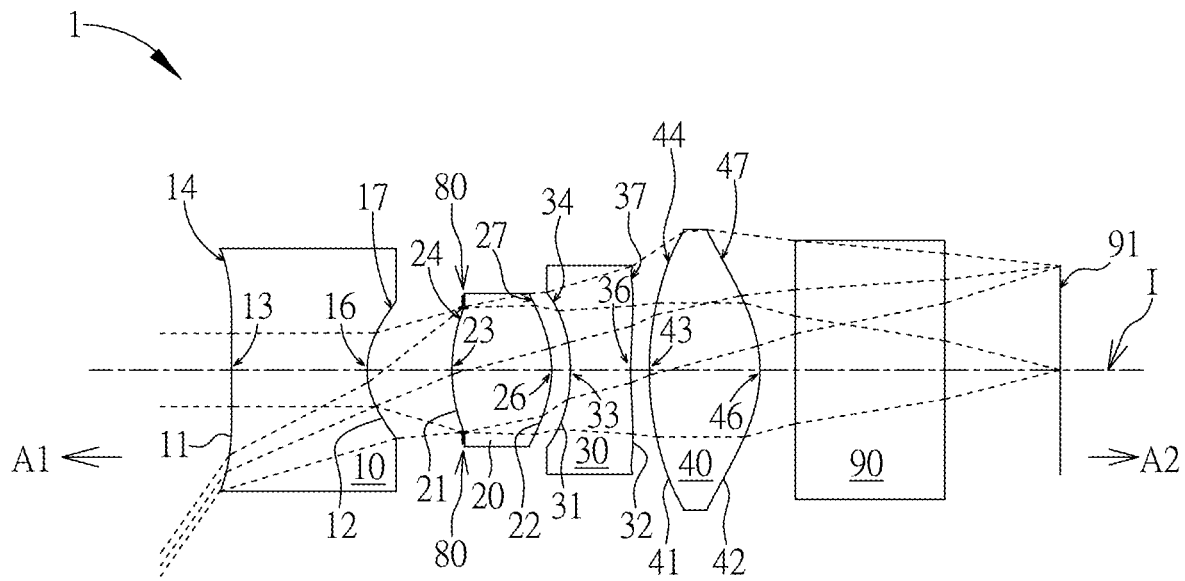
FIG. 6
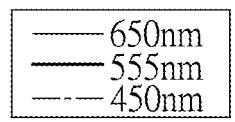
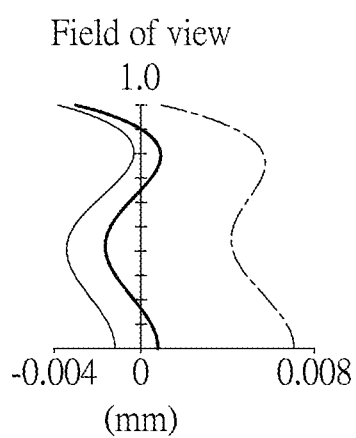
Field of view
1.0
-0.004  0  0.008
(mm)
Longitudinal
spherical
aberration
FIG. 7A
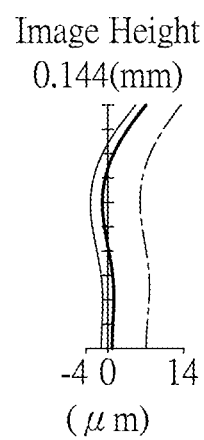
Image Height
0.144(mm)
-4  0  14
(μm)
Sagittal
field
curvature
FIG. 7B
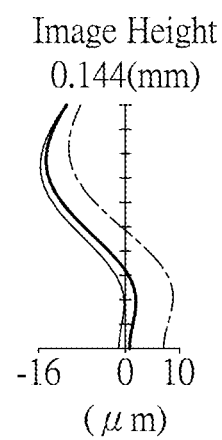
Image Height
0.144(mm)
-16  0  10
(μm)
Tangential
field
curvature
FIG. 7C
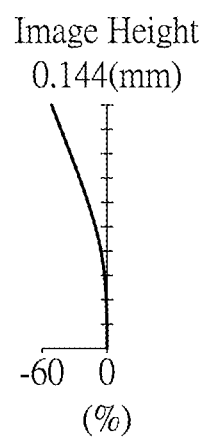
Image Height
0.144(mm)
-60  0
(%)
Distortion
FIG. 7D

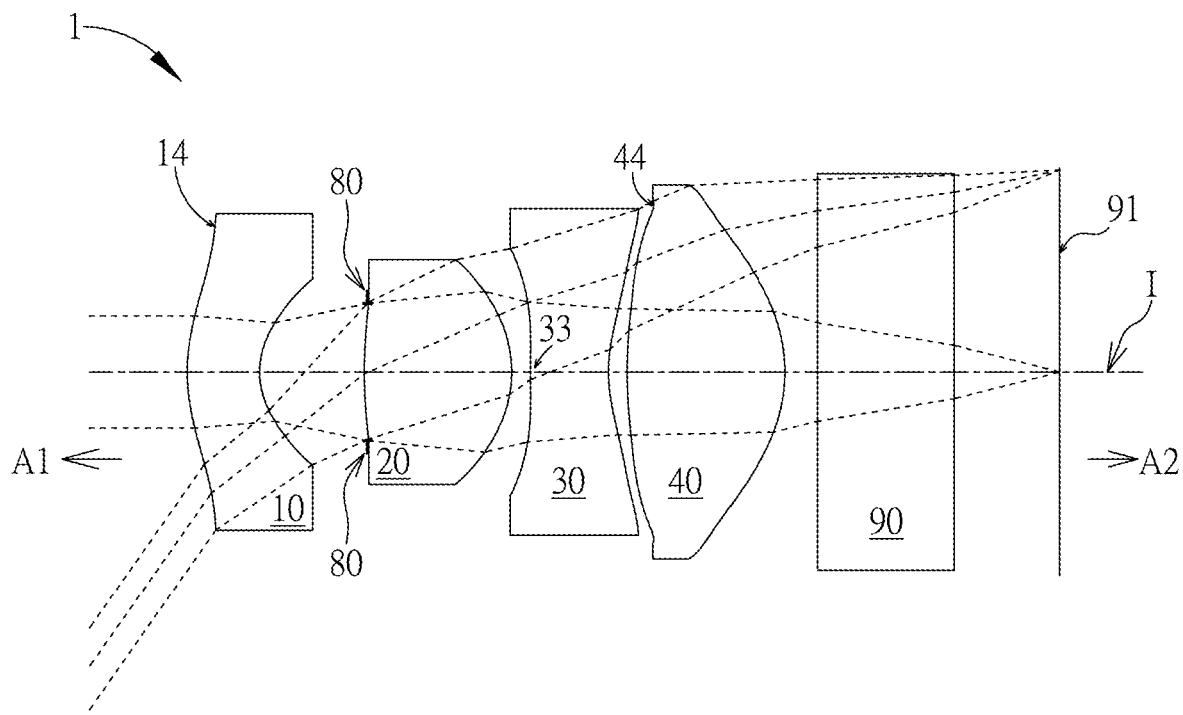
FIG. 10
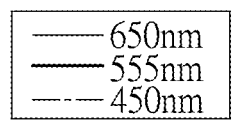
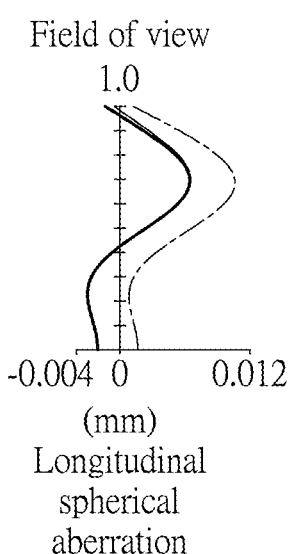
FIG. 11A
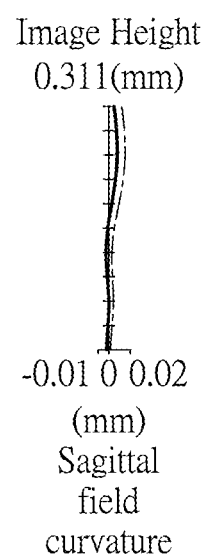
FIG. 11B
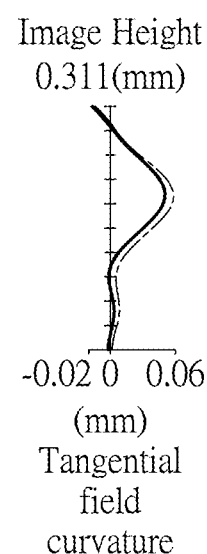
FIG. 11C
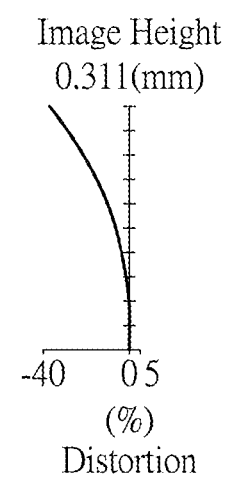
FIG. 11D

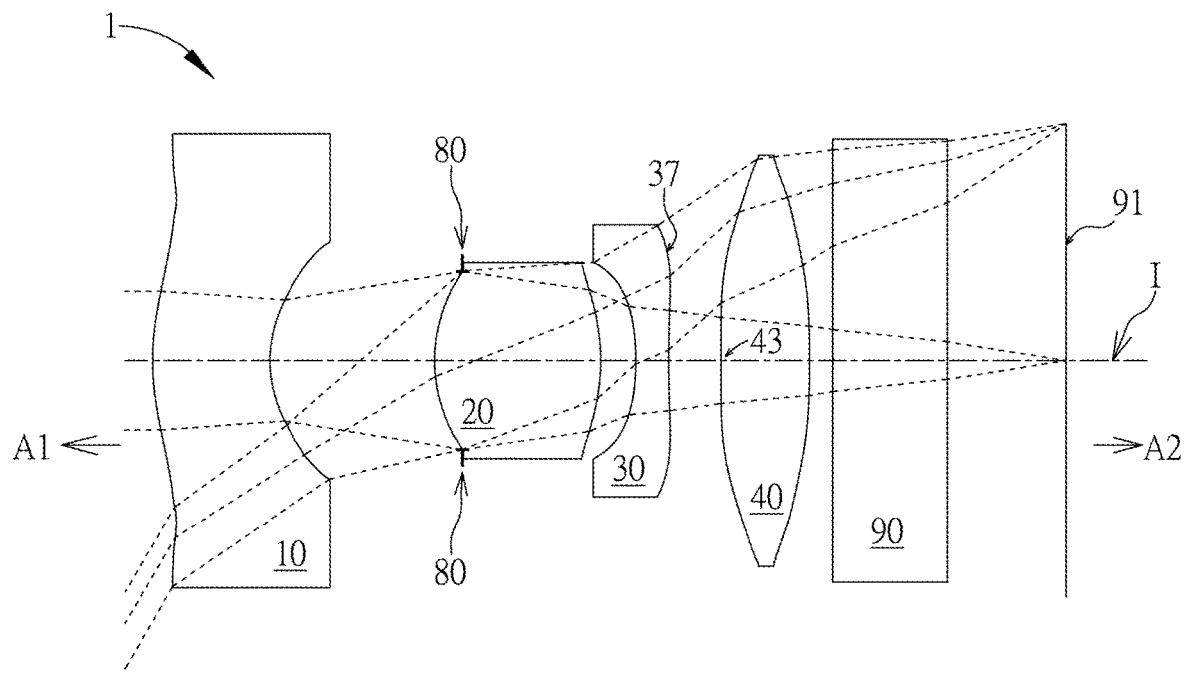
FIG. 14
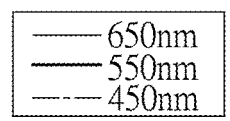
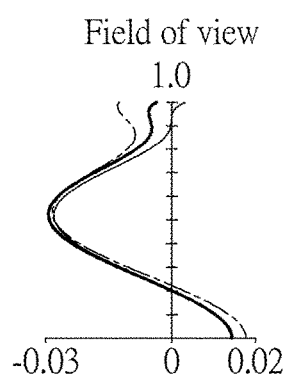 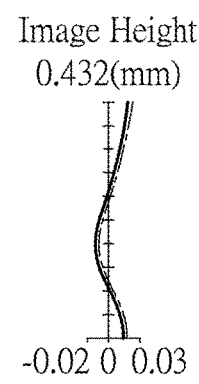 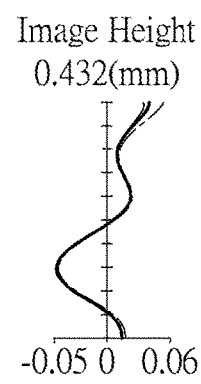 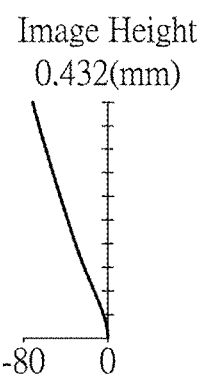
FIG. 15A  FIG. 15B  FIG. 15C  FIG. 15D

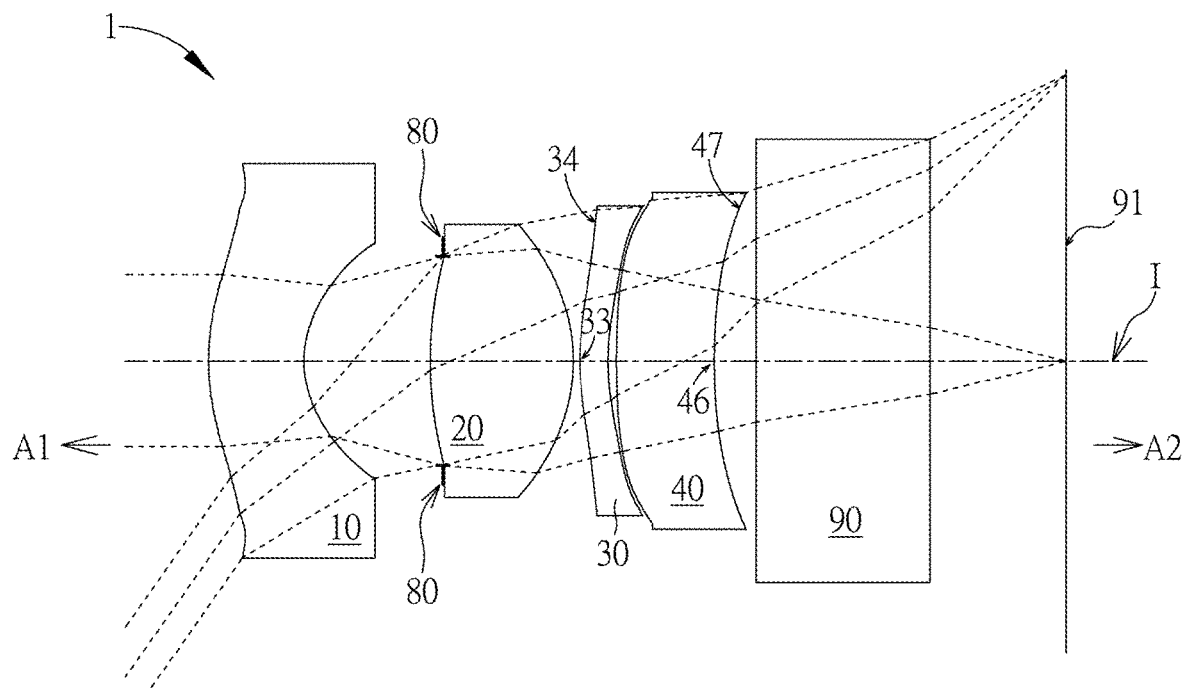
FIG. 28
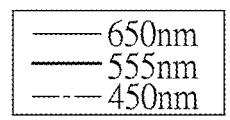
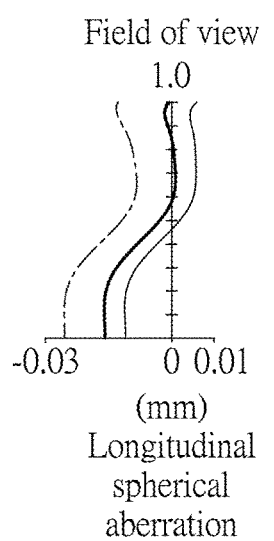
Field of view
1.0
-0.03  0 0.01
(mm)
Longitudinal
spherical
aberration
FIG. 29A
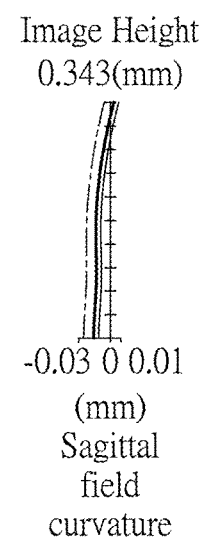
Image Height
0.343(mm)
-0.03 0 0.01
(mm)
Sagittal
field
curvature
FIG. 29B
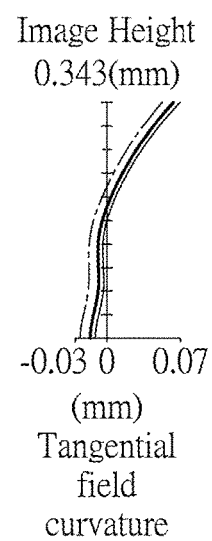
Image Height
0.343(mm)
-0.03 0   0.07
(mm)
Tangential
field
curvature
FIG. 29C
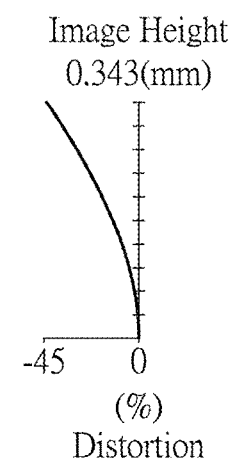
Image Height
0.343(mm)
-45    0
(%)
Distortion
FIG. 29D

| First Embodiment | | | | | |
|---|---|---|---|---|---|
| EFL=0.207mm, HFOV=54.721 Degrees, TTL=1.168mm, Fno=2.000, ImgH=0.144mm | | | | | |
| No. | | Radius of curvature (mm) | Aperture Stop Distance/ Thickness/ Air Gap (mm) | Refractive index | Abbe No. | Focal length (mm) |
| | Object | INFINITY | INFINITY | | | |
| 11 | First Lens element | 28.659 | 0.191 | T1 | 1.535 | 55.690 | -0.196 |
| 12 | | 0.104 | 0.135 | G12 | | | |
| 80 | Ape. Stop | INFINITY | -0.016 | | | |
| 21 | Second Lens element | 0.248 | 0.140 | T2 | 1.535 | 55.690 | 0.204 |
| 22 | | -0.157 | 0.027 | G23 | | | |
| 31 | Third Lens element | -0.242 | 0.085 | T3 | 1.661 | 20.373 | -0.248 |
| 32 | | 0.592 | 0.026 | G34 | | | |
| 41 | Fourth Lens element | 0.460 | 0.156 | T4 | 1.535 | 55.690 | 0.272 |
| 42 | | -0.188 | 0.050 | G4F | | | |
| 90 | Filter | INFINITY | 0.210 | | 1.517 | 64.167 | |
| | | INFINITY | 0.163 | | | |
| 91 | Image Plane | INFINITY | | | | |

FIG. 32

| No. | 11 | 12 | 21 | 22 |
|---|---|---|---|---|
| K | 0.000000E+00 | -1.052991E+00 | 1.911431E+00 | -2.205988E+00 |
| $a_4$ | -5.550331E+00 | 3.463749E+01 | 1.913253E+01 | -4.253963E+00 |
| $a_6$ | -1.211974E+03 | -2.098990E+04 | -8.967595E+03 | 1.432122E+03 |
| $a_8$ | 3.968031E+04 | 2.824037E+06 | 1.514386E+06 | 1.116511E+03 |
| $a_{10}$ | -6.697998E+05 | -2.351153E+08 | -1.507455E+08 | -5.393654E+06 |
| $a_{12}$ | 5.838426E+06 | 1.143410E+10 | 8.504579E+09 | 3.340678E+08 |
| $a_{14}$ | -2.021445E+07 | -2.961899E+11 | -2.554145E+11 | -8.531172E+09 |
| $a_{16}$ | -1.020904E+07 | 3.145796E+12 | 3.166316E+12 | 8.315731E+10 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | 1.218841E+01 | -2.274990E-01 | -1.681339E+00 |
| $a_4$ | -6.665279E+01 | -8.449581E+01 | 1.366561E+01 | 1.414224E+01 |
| $a_6$ | 7.940306E+02 | 2.910378E+03 | -9.446580E+02 | -9.291457E+02 |
| $a_8$ | 1.690877E+05 | -1.113032E+05 | 2.944083E+03 | 7.210422E+04 |
| $a_{10}$ | -1.484366E+07 | 3.969667E+06 | 2.222969E+06 | -3.295319E+06 |
| $a_{12}$ | 5.882592E+08 | -9.773678E+07 | -1.048110E+08 | 9.586808E+07 |
| $a_{14}$ | -1.182787E+10 | 1.502901E+09 | 2.396438E+09 | -1.766842E+09 |
| $a_{16}$ | 8.544546E+10 | -1.408154E+10 | -3.161695E+10 | 2.000406E+10 |
| $a_{18}$ | 6.888003E+11 | 7.589101E+10 | 2.334014E+11 | -1.263413E+11 |
| $a_{20}$ | -1.072212E+13 | -1.897375E+11 | -7.544661E+11 | 3.379998E+11 |

FIG. 33

| No. | | Radius of curvature (mm) | Aperture Stop Distance/ Thickness/ Air Gap (mm) | | Refractive index | Abbe No. | Focal length (mm) |
|---|---|---|---|---|---|---|---|
| | Second Embodiment |
| | EFL=0.327mm, HFOV=70.074 Degrees, TTL=1.657mm, Fno=2.175, ImgH=0.292mm |
| | Object | INFINITY | INFINITY | | | | |
| 11 | First Lens element | 2.848 | 0.157 | T1 | 1.545 | 55.987 | -0.421 |
| 12 | | 0.209 | 0.429 | G12 | | | |
| 80 | Ape. Stop | INFINITY | -0.003 | | | | |
| 21 | Second Lens element | 0.475 | 0.190 | T2 | 1.535 | 55.690 | 0.329 |
| 22 | | -0.242 | 0.074 | G23 | | | |
| 31 | Third Lens element | -3.375 | 0.096 | T3 | 1.661 | 20.373 | -0.555 |
| 32 | | 0.421 | 0.049 | G34 | | | |
| 41 | Fourth Lens element | -42.511 | 0.221 | T4 | 1.535 | 55.690 | 0.826 |
| 42 | | -0.440 | 0.024 | G4F | | | |
| 90 | Filter | INFINITY | 0.210 | | 1.517 | 64.167 | |
| | | INFINITY | 0.210 | | | | |
| 91 | Image Plane | INFINITY | | | | | |

FIG. 34

| No. | 11 | 12 | 21 | 22 |
|---|---|---|---|---|
| K | 0.000000E+00 | 0.000000E+00 | 0.000000E+00 | 0.000000E+00 |
| $a_4$ | -2.157055E+00 | -5.732772E+00 | -7.860258E+00 | 1.529537E+01 |
| $a_6$ | -1.610183E+01 | -1.854492E+02 | 4.912529E+01 | -1.783955E+02 |
| $a_8$ | 2.104381E+02 | -2.098783E+02 | -4.255287E+03 | 5.139367E+03 |
| $a_{10}$ | -5.843922E+02 | -3.696393E+04 | -8.065830E+04 | -9.025173E+04 |
| No. | 31 | 32 | 41 | 42 |
| K | 0.000000E+00 | 0.000000E+00 | 0.000000E+00 | 0.000000E+00 |
| $a_4$ | -1.380008E+01 | -6.225496E+00 | 3.004428E+01 | 8.403343E+00 |
| $a_6$ | 3.074927E+02 | 2.740974E+02 | -6.292576E+02 | -2.044417E+01 |
| $a_8$ | -4.445743E+03 | -5.602161E+03 | 9.204067E+03 | -8.845272E+02 |
| $a_{10}$ | 1.264896E+04 | 1.485293E+04 | -8.366791E+04 | 4.330465E+03 |

FIG. 35

| Third Embodiment |||||||
|---|---|---|---|---|---|---|
| EFL=0.345mm, HFOV=55.000 Degrees, TTL=1.342mm, Fno=2.000, ImgH=0.311mm |||||||
| No. | | Radius of curvature (mm) | Aperture Stop Distance/ Thickness/ Air Gap (mm) | | Refractive index | Abbe No. | Focal length (mm) |
| | Object | INFINITY | INFINITY | | | | |
| 11 | First Lens element | 0.312 | 0.111 | T1 | 1.535 | 55.690 | -0.482 |
| 12 | | 0.124 | 0.166 | G12 | | | |
| 80 | Ape. Stop | INFINITY | -0.005 | | | | |
| 21 | Second Lens element | 0.782 | 0.227 | T2 | 1.535 | 55.690 | 0.314 |
| 22 | | -0.193 | 0.029 | G23 | | | |
| 31 | Third Lens element | 2.667 | 0.120 | T3 | 1.651 | 21.514 | -0.391 |
| 32 | | 0.229 | 0.029 | G34 | | | |
| 41 | Fourth Lens element | 0.729 | 0.243 | T4 | 1.531 | 49.620 | 0.367 |
| 42 | | -0.237 | 0.050 | G4F | | | |
| 90 | Filter | INFINITY | 0.210 | | 1.517 | 64.167 | |
| | | INFINITY | 0.163 | | | | |
| 91 | Image Plane | INFINITY | | | | | |

FIG. 36

| No. | 11 | 12 | 21 | 22 |
|---|---|---|---|---|
| K | 0.000000E+00 | -5.068132E-01 | 8.698782E+00 | -8.524324E-02 |
| $a_4$ | -5.550331E+00 | 3.463749E+01 | 1.913253E+01 | -4.253963E+00 |
| $a_6$ | -1.211974E+03 | -2.098990E+04 | -8.967595E+03 | 1.432122E+03 |
| $a_8$ | 3.968031E+04 | 2.824037E+06 | 1.514386E+06 | 1.116511E+03 |
| $a_{10}$ | -6.697998E+05 | -2.351153E+08 | -1.507455E+08 | -5.393654E+06 |
| $a_{12}$ | 5.838426E+06 | 1.143410E+10 | 8.504579E+09 | 3.340678E+08 |
| $a_{14}$ | -2.021445E+07 | -2.961899E+11 | -2.554145E+11 | -8.531172E+09 |
| $a_{16}$ | -1.020904E+07 | 3.145796E+12 | 3.166316E+12 | 8.315731E+10 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | -6.921923E-01 | -6.496809E+01 | -4.899727E-01 |
| $a_4$ | -6.665279E+01 | -8.449581E+01 | 1.366561E+01 | 1.414224E+01 |
| $a_6$ | 7.940306E+02 | 2.910378E+03 | -9.446580E+02 | -9.291457E+02 |
| $a_8$ | 1.690877E+05 | -1.113032E+05 | 2.944083E+03 | 7.210422E+04 |
| $a_{10}$ | -1.484366E+07 | 3.969667E+06 | 2.222969E+06 | -3.295319E+06 |
| $a_{12}$ | 5.882592E+08 | -9.773678E+07 | -1.048110E+08 | 9.586808E+07 |
| $a_{14}$ | -1.182787E+10 | 1.502901E+09 | 2.396438E+09 | -1.766842E+09 |
| $a_{16}$ | 8.544546E+10 | -1.408154E+10 | -3.161695E+10 | 2.000406E+10 |
| $a_{18}$ | 6.888003E+11 | 7.589101E+10 | 2.334014E+11 | -1.263413E+11 |
| $a_{20}$ | -1.072212E+13 | -1.897375E+11 | -7.544661E+11 | 3.379998E+11 |

FIG. 37

| No. | | Radius of curvature (mm) | Aperture Stop Distance/ Thickness/ Air Gap (mm) | | Refractive index | Abbe No. | Focal length (mm) |
|---|---|---|---|---|---|---|---|
| | Fourth Embodiment |||||||
| | EFL=0.388mm, HFOV=70.192 Degrees, TTL=1.463mm, Fno=2.291, ImgH=0.336mm |||||||
| | Object | INFINITY | INFINITY | | | | |
| 11 | First Lens element | 3.009 | 0.158 | T1 | 1.545 | 55.987 | -0.524 |
| 12 | | 0.257 | 0.414 | G12 | | | |
| 80 | Ape. Stop | INFINITY | -0.042 | | | | |
| 21 | Second Lens element | 0.289 | 0.168 | T2 | 1.535 | 55.690 | 0.325 |
| 22 | | -0.350 | 0.103 | G23 | | | |
| 31 | Third Lens element | -0.674 | 0.082 | T3 | 1.671 | 19.268 | -0.506 |
| 32 | | 0.734 | 0.074 | G34 | | | |
| 41 | Fourth Lens element | -0.540 | 0.071 | T4 | 1.535 | 55.690 | 0.749 |
| 42 | | -0.241 | 0.015 | G4F | | | |
| 90 | Filter | INFINITY | 0.210 | | 1.517 | 64.167 | |
| | | INFINITY | 0.210 | | | | |
| 91 | Image Plane | INFINITY | | | | | |

FIG. 38

| No. | 11 | 12 | 21 | 22 |
|---|---|---|---|---|
| K | 0.000000E+00 | 0.000000E+00 | 0.000000E+00 | 0.000000E+00 |
| $a_4$ | -5.118357E+00 | -4.382007E+00 | 1.076047E+00 | 1.693003E+01 |
| $a_6$ | -6.599928E+00 | -9.043971E+01 | -1.519453E+01 | -1.564028E+02 |
| $a_8$ | 3.605319E+02 | -5.877095E+03 | -2.876036E+01 | -7.482580E+02 |
| $a_{10}$ | -1.405767E+03 | 1.926500E+05 | 1.406125E+05 | 5.758920E+05 |
| $a_{12}$ | 0.000000E+00 | 0.000000E+00 | -1.078498E+06 | -8.631889E+06 |
| No. | 31 | 32 | 41 | 42 |
| K | 3.837251E+00 | 2.094770E+00 | 4.870172E-01 | 1.880178E-01 |
| $a_4$ | -1.700243E+01 | -1.193722E+01 | 2.273006E+01 | 1.711817E+01 |
| $a_6$ | -4.329669E+02 | 4.061305E+00 | -5.757724E+02 | 9.888295E+01 |
| $a_8$ | 2.399162E+04 | 7.381462E+02 | 2.773398E+03 | -4.814419E+03 |
| $a_{10}$ | -5.947094E+05 | -1.051118E+04 | -4.132134E+04 | 4.637540E+04 |
| $a_{12}$ | -2.603353E+06 | 2.568905E+05 | -9.670425E+05 | -4.726955E+05 |

FIG. 39

| No. | | Radius of curvature (mm) | Aperture Stop Distance/ Thickness/ Air Gap (mm) | | Refractive index | Abbe No. | Focal length (mm) |
|---|---|---|---|---|---|---|---|
| \multicolumn{8}{|c|}{Fifth Embodiment} |
| \multicolumn{8}{|c|}{EFL=0.880mm, HFOV=59.863 Degrees, TTL=1.666mm, Fno=3.205, ImgH=0.432mm} |
| | Object | INFINITY | INFINITY | | | | |
| 11 | First Lens element | 0.488 | 0.213 | T1 | 1.545 | 55.987 | -1.048 |
| 12 | | 0.223 | 0.351 | G12 | | | |
| 80 | Ape. Stop | INFINITY | -0.050 | | | | |
| 21 | Second Lens element | 0.282 | 0.304 | T2 | 1.535 | 55.690 | 0.357 |
| 22 | | -0.373 | 0.064 | G23 | | | |
| 31 | Third Lens element | -0.458 | 0.060 | T3 | 1.661 | 20.373 | -0.526 |
| 32 | | 1.593 | 0.095 | G34 | | | |
| 41 | Fourth Lens element | -7.139 | 0.161 | T4 | 1.535 | 55.690 | 25.661 |
| 42 | | -4.739 | 0.042 | G4F | | | |
| 90 | Filter | INFINITY | 0.210 | | 1.517 | 64.167 | |
| | | INFINITY | 0.216 | | | | |
| 91 | Image Plane | INFINITY | | | | | |

FIG. 40

| No. | 11 | 12 | 21 | 22 |
|---|---|---|---|---|
| K | 0.000000E+00 | 0.000000E+00 | 0.000000E+00 | 0.000000E+00 |
| $a_4$ | -7.284914E+00 | -6.226420E+00 | 2.073629E+00 | -1.984910E+00 |
| $a_6$ | -3.123911E+01 | -7.777344E+02 | -2.852987E+02 | 1.016299E+03 |
| $a_8$ | 3.722135E+02 | 1.903636E+04 | 1.245622E+04 | -3.763855E+04 |
| $a_{10}$ | -9.642779E+02 | -2.474596E+05 | -1.809272E+05 | 5.910952E+05 |
| $a_{12}$ | 0.000000E+00 | -6.095545E-02 | 1.438816E+05 | -2.306884E+05 |
| No. | 31 | 32 | 41 | 42 |
| K | 1.489304E+00 | -9.218867E+01 | -4.853735E+01 | -4.584399E+01 |
| $a_4$ | 2.124829E+00 | -4.663147E+00 | 1.340758E+01 | -1.655930E+01 |
| $a_6$ | -2.917148E+03 | -7.190076E+01 | -1.034494E+02 | 3.045545E+02 |
| $a_8$ | 1.242674E+05 | -1.007387E+03 | 1.444399E+02 | -2.504086E+03 |
| $a_{10}$ | -2.436368E+06 | 1.771826E+04 | 9.646701E+02 | 7.917519E+03 |
| $a_{12}$ | 6.773424E+06 | -1.887261E+04 | -9.545248E+02 | -3.456914E+03 |

FIG. 41

| No. | | Radius of curvature (mm) | Aperture Stop Distance/ Thickness/ Air Gap (mm) | | Refractive index | Abbe No. | Focal length (mm) |
|---|---|---|---|---|---|---|---|
| | Sixth Embodiment |
| | EFL=0.635mm, HFOV=65.010 Degrees, TTL=2.977mm, Fno=2.200, ImgH=0.700mm |
| | Object | INFINITY | INFINITY | | | | |
| 11 | First Lens element | 1.030 | 0.282 | T1 | 1.535 | 55.690 | -0.697 |
| 12 | | 0.248 | 0.344 | G12 | | | |
| 80 | Ape. Stop | INFINITY | -0.017 | | | | |
| 21 | Second Lens element | 1.124 | 0.572 | T2 | 1.535 | 55.690 | 0.652 |
| 22 | | -0.418 | 0.010 | G23 | | | |
| 31 | Third Lens element | 1.315 | 0.209 | T3 | 1.661 | 20.373 | -1.294 |
| 32 | | 0.488 | 0.065 | G34 | | | |
| 41 | Fourth Lens element | 2.954 | 0.533 | T4 | 1.535 | 55.690 | 0.998 |
| 42 | | -0.613 | 0.116 | G4F | | | |
| 90 | Filter | INFINITY | 0.585 | | 1.517 | 64.167 | |
| | | INFINITY | 0.278 | | | | |
| 91 | Image Plane | INFINITY | | | | | |

FIG. 42

| No. | 11 | 12 | 21 | 22 |
|---|---|---|---|---|
| K | 0.000000E+00 | -4.268823E-01 | 8.040473E+00 | -1.152466E-01 |
| $a_4$ | -6.261060E-01 | 1.663307E+00 | 5.815704E-01 | -4.948204E-01 |
| $a_6$ | -1.966920E+00 | -1.930726E+02 | -7.299958E+01 | 4.383439E+01 |
| $a_8$ | 6.129486E+00 | 5.294560E+03 | 2.554360E+03 | -3.474763E+02 |
| $a_{10}$ | -5.750911E+00 | -9.853785E+04 | -5.405219E+04 | 1.298275E+03 |
| $a_{12}$ | 0.000000E+00 | 1.015286E+06 | 6.481423E+05 | 2.480036E+03 |
| $a_{14}$ | 0.000000E+00 | -5.310033E+06 | -4.096731E+06 | -3.384993E+04 |
| $a_{16}$ | 0.000000E+00 | 8.921351E+06 | 8.664484E+06 | 9.802147E+04 |
| No. | 31 | 32 | 41 | 42 |
| K | 0.000000E+00 | -6.968190E-01 | 2.240293E+01 | -4.882044E-01 |
| $a_4$ | -8.399857E+00 | -6.593424E+00 | 8.301597E-01 | 4.784643E-01 |
| $a_6$ | 1.092133E+02 | 4.556745E+01 | -4.277707E-01 | 3.193842E+00 |
| $a_8$ | -1.263177E+03 | -2.745938E+02 | -5.345358E+01 | -2.723845E+01 |
| $a_{10}$ | 9.762080E+03 | 1.131091E+03 | 3.939940E+02 | 1.186229E+02 |
| $a_{12}$ | -4.686044E+04 | -2.879637E+03 | -1.266045E+03 | -3.244010E+02 |
| $a_{14}$ | 1.191454E+05 | 4.016459E+03 | 1.933728E+03 | 4.993669E+02 |
| $a_{16}$ | -1.187176E+05 | -2.367791E+03 | -1.188144E+03 | -3.055984E+02 |

FIG. 43

| Seventh Embodiment |||||||
|---|---|---|---|---|---|---|
| EFL=0.406mm, HFOV=55.011 Degrees, TTL=2.387mm, Fno=2.050, ImgH=0.350mm |||||||
| No. | | Radius of curvature (mm) | Aperture Stop Distance/ Thickness/ Air Gap (mm) | | Refractive index | Abbe No. | Focal length (mm) |
| | Object | INFINITY | INFINITY | | | | |
| 11 | First Lens element | 1.047 | 0.295 | T1 | 1.535 | 55.690 | -0.506 |
| 12 | | 0.195 | 0.301 | G12 | | | |
| 80 | Ape. Stop | INFINITY | -0.004 | | | | |
| 21 | Second Lens element | 0.809 | 0.522 | T2 | 1.535 | 55.690 | 0.481 |
| 22 | | -0.294 | 0.011 | G23 | | | |
| 31 | Third Lens element | 1.395 | 0.169 | T3 | 1.661 | 20.373 | -0.673 |
| 32 | | 0.323 | 0.047 | G34 | | | |
| 41 | Fourth Lens element | 1.820 | 0.412 | T4 | 1.535 | 55.690 | 0.621 |
| 42 | | -0.376 | 0.075 | G4F | | | |
| 90 | Filter | INFINITY | 0.315 | | 1.517 | 64.167 | |
| | | INFINITY | 0.245 | | | | |
| 91 | Image Plane | INFINITY | | | | | |

FIG. 44

| No. | 11 | 12 | 21 | 22 |
|---|---|---|---|---|
| K | 0.000000E+00 | -5.691350E-01 | 5.883609E+00 | -6.922408E-02 |
| $a_4$ | 8.066904E-01 | 4.564406E+00 | 5.325138E+00 | 1.563971E+00 |
| $a_6$ | -1.381478E+02 | -2.430542E+03 | -1.102315E+03 | 2.068579E+02 |
| $a_8$ | 2.202903E+03 | 1.592924E+05 | 8.670993E+04 | 6.000196E+01 |
| $a_{10}$ | -1.764608E+04 | -6.118147E+06 | -3.963326E+06 | -1.426751E+05 |
| $a_{12}$ | 7.020079E+04 | 1.340205E+08 | 9.931781E+07 | 3.889755E+06 |
| $a_{14}$ | -9.632803E+04 | -1.509406E+09 | -1.260632E+09 | -4.350898E+07 |
| $a_{16}$ | -6.777600E+04 | 6.505660E+09 | 6.666295E+09 | 1.869329E+08 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | -7.479902E-01 | 1.670162E+01 | -3.427330E-01 |
| $a_4$ | -1.891225E+01 | -2.556706E+01 | 4.547699E+00 | 5.456851E+00 |
| $a_6$ | 1.034073E+02 | 3.941771E+02 | -1.259123E+02 | -1.243274E+02 |
| $a_8$ | 9.889583E+03 | -6.516818E+03 | 1.569228E+02 | 4.224175E+03 |
| $a_{10}$ | -3.857624E+05 | 1.029902E+05 | 5.776779E+04 | -8.576406E+04 |
| $a_{12}$ | 6.800570E+06 | -1.130888E+06 | -1.211805E+06 | 1.108130E+06 |
| $a_{14}$ | -6.078218E+07 | 7.726553E+06 | 1.231409E+07 | -9.077953E+06 |
| $a_{16}$ | 1.950105E+08 | -3.209838E+07 | -7.219782E+07 | 4.569072E+07 |
| $a_{18}$ | 6.992268E+08 | 7.731766E+07 | 2.369482E+08 | -1.281836E+08 |
| $a_{20}$ | -4.821718E+09 | -8.541931E+07 | -3.397296E+08 | 1.524958E+08 |

FIG. 45

| \multicolumn{6}{c}{Eighth Embodiment} |

| Eighth Embodiment | | | | | |
|---|---|---|---|---|---|
| \multicolumn{6}{c}{EFL=0.391mm, HFOV=70.000 Degrees, TTL=1.225mm, Fno=2.200, ImgH=0.339mm} | | | | | |
| No. | | Radius of curvature (mm) | Aperture Stop Distance/ Thickness/ Air Gap (mm) | Refractive index | Abbe No. | Focal length (mm) |
| | Object | INFINITY | INFINITY | | | |
| 11 | First Lens element | 0.334 | 0.139 | T1 | 1.535 | 55.690 | -0.459 |
| 12 | | 0.121 | 0.145 | G12 | | | |
| 80 | Ape. Stop | INFINITY | -0.011 | | | | |
| 21 | Second Lens element | 0.487 | 0.209 | T2 | 1.535 | 55.690 | 0.305 |
| 22 | | -0.210 | 0.014 | G23 | | | |
| 31 | Third Lens element | 0.799 | 0.133 | T3 | 1.661 | 20.373 | -0.611 |
| 32 | | 0.252 | 0.033 | G34 | | | |
| 41 | Fourth Lens element | 1.366 | 0.187 | T4 | 1.535 | 55.690 | 0.489 |
| 42 | | -0.309 | 0.050 | G4F | | | |
| 90 | Filter | INFINITY | 0.210 | | 1.517 | 64.167 | |
| | | INFINITY | 0.117 | | | | |
| 91 | Image Plane | INFINITY | | | | | |

FIG. 46

| No. | 11 | 12 | 21 | 22 |
|---|---|---|---|---|
| K | 0.000000E+00 | -2.991915E-01 | 9.378958E+00 | -8.360310E-02 |
| $a_4$ | 0.000000E+00 | 0.000000E+00 | 0.000000E+00 | 0.000000E+00 |
| $a_6$ | -2.230835E+01 | -3.133621E+01 | 8.855303E+01 | -7.999694E+01 |
| $a_8$ | -4.766421E+01 | -1.183814E+04 | -3.695642E+04 | 1.340051E+04 |
| $a_{10}$ | 2.467583E+03 | 2.324650E+06 | 7.400123E+06 | -1.204508E+06 |
| $a_{12}$ | -1.665933E+04 | -2.764680E+08 | -8.683322E+08 | 6.907997E+07 |
| $a_{14}$ | 0.000000E+00 | 1.842593E+10 | 5.887513E+10 | -2.401150E+09 |
| $a_{16}$ | 0.000000E+00 | -6.491783E+11 | -2.144566E+12 | 4.576724E+10 |
| $a_{18}$ | 0.000000E+00 | 9.370125E+12 | 3.242803E+13 | -3.629233E+11 |
| No. | 31 | 32 | 41 | 42 |
| K | 0.000000E+00 | -5.237116E-01 | 2.379321E+01 | -2.789204E-01 |
| $a_4$ | 0.000000E+00 | 0.000000E+00 | 0.000000E+00 | 0.000000E+00 |
| $a_6$ | -1.324896E+02 | -6.337087E+01 | -5.127822E-01 | 1.052642E+01 |
| $a_8$ | 1.459544E+04 | 2.651010E+03 | 1.500892E+02 | -1.074324E+03 |
| $a_{10}$ | -1.220536E+06 | -9.923989E+04 | -8.937709E+03 | 5.862464E+04 |
| $a_{12}$ | 6.383790E+07 | 2.510589E+06 | 2.804035E+05 | -1.722460E+06 |
| $a_{14}$ | -2.015432E+09 | -3.924757E+07 | -4.686897E+06 | 2.789603E+07 |
| $a_{16}$ | 3.477553E+10 | 3.392083E+08 | 4.014335E+07 | -2.321167E+08 |
| $a_{18}$ | -2.519286E+11 | -1.257653E+09 | -1.573259E+08 | 7.863242E+08 |

FIG. 47

| No. | | Radius of curvature (mm) | Aperture Stop Distance/ Thickness/ Air Gap (mm) | | Refractive index | Abbe No. | Focal length (mm) |
|---|---|---|---|---|---|---|---|
| | Ninth Embodiment |
| | EFL=0.428mm, HFOV=54.989 Degrees, TTL=1.217mm, Fno=2.000, ImgH=0.350mm |
| | Object | INFINITY | INFINITY | | | | |
| 11 | First Lens element | 0.284 | 0.120 | T1 | 1.568 | 37.311 | -0.647 |
| 12 | | 0.136 | 0.145 | G12 | | | |
| 80 | Ape. Stop | INFINITY | -0.003 | | | | |
| 21 | Second Lens element | 0.637 | 0.224 | T2 | 1.535 | 55.690 | 0.308 |
| 22 | | -0.196 | 0.043 | G23 | | | |
| 31 | Third Lens element | 0.770 | 0.101 | T3 | 1.661 | 20.373 | -0.470 |
| 32 | | 0.211 | 0.029 | G34 | | | |
| 41 | Fourth Lens element | 1.600 | 0.187 | T4 | 1.535 | 55.690 | 0.475 |
| 42 | | -0.290 | 0.050 | G4F | | | |
| 90 | Filter | INFINITY | 0.210 | | 1.517 | 64.167 | |
| | | INFINITY | 0.109 | | | | |
| 91 | Image Plane | INFINITY | | | | | |

FIG. 48

| No. | 11 | 12 | 21 | 22 |
|---|---|---|---|---|
| K | 0.000000E+00 | -4.714105E-01 | -1.168048E+01 | 7.692179E-03 |
| $a_4$ | -4.772394E+00 | 3.604320E+01 | 1.525735E+01 | -6.509778E+00 |
| $a_6$ | -1.269362E+03 | -2.096105E+04 | -9.059588E+03 | 1.324123E+03 |
| $a_8$ | 3.881937E+04 | 2.818073E+06 | 1.505483E+06 | 1.017960E+03 |
| $a_{10}$ | -6.686953E+05 | -2.352217E+08 | -1.510358E+08 | -5.390296E+06 |
| $a_{12}$ | 6.006751E+06 | 1.143305E+10 | 8.503430E+09 | 3.339913E+08 |
| $a_{14}$ | -1.896718E+07 | -2.962783E+11 | -2.556253E+11 | -8.537551E+09 |
| $a_{16}$ | -5.209343E+07 | 3.145250E+12 | 3.013721E+12 | 8.270387E+10 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | -7.787374E-01 | 2.654356E+01 | -3.385120E-01 |
| $a_4$ | -6.838604E+01 | -8.462708E+01 | 1.405281E+01 | 1.420856E+01 |
| $a_6$ | 7.428940E+02 | 2.908787E+03 | -9.438347E+02 | -9.309335E+02 |
| $a_8$ | 1.690235E+05 | -1.113512E+05 | 2.882777E+03 | 7.212357E+04 |
| $a_{10}$ | -1.482968E+07 | 3.970081E+06 | 2.221789E+06 | -3.294690E+06 |
| $a_{12}$ | 5.885669E+08 | -9.771288E+07 | -1.048266E+08 | 9.588043E+07 |
| $a_{14}$ | -1.182496E+10 | 1.503324E+09 | 2.396299E+09 | -1.766675E+09 |
| $a_{16}$ | 8.540122E+10 | -1.407822E+10 | -3.161684E+10 | 2.000527E+10 |
| $a_{18}$ | 6.856157E+11 | 7.585043E+10 | 2.334463E+11 | -1.263511E+11 |
| $a_{20}$ | -1.083135E+13 | -1.921943E+11 | -7.529955E+11 | 3.374145E+11 |

FIG. 49

| No. | | Radius of curvature (mm) | Aperture Stop Distance/ Thickness/ Air Gap (mm) | | Refractive index | Abbe No. | Focal length (mm) |
|---|---|---|---|---|---|---|---|
| | Tenth Embodiment |||||||
| | EFL=0.384mm, HFOV=70.083 Degrees, TTL=1.283mm, Fno=2.000, ImgH=0.364mm |||||||
| | Object | INFINITY | INFINITY | | | | |
| 11 | First Lens element | 0.321 | 0.105 | T1 | 1.535 | 55.690 | -0.480 |
| 12 | | 0.127 | 0.149 | G12 | | | |
| 80 | Ape. Stop | INFINITY | -0.009 | | | | |
| 21 | Second Lens element | 0.650 | 0.223 | T2 | 1.535 | 55.690 | 0.312 |
| 22 | | -0.198 | 0.010 | G23 | | | |
| 31 | Third Lens element | 0.726 | 0.115 | T3 | 1.661 | 20.373 | -0.527 |
| 32 | | 0.222 | 0.031 | G34 | | | |
| 41 | Fourth Lens element | 1.488 | 0.236 | T4 | 1.535 | 55.690 | 0.468 |
| 42 | | -0.285 | 0.050 | G4F | | | |
| 90 | Filter | INFINITY | 0.210 | | 1.517 | 64.167 | |
| | | INFINITY | 0.163 | | | | |
| 91 | Image Plane | INFINITY | | | | | |

FIG. 50

| No. | 11 | 12 | 21 | 22 |
|---|---|---|---|---|
| K | 0.000000E+00 | -4.245527E-01 | 9.420849E+00 | -2.890037E-02 |
| $a_4$ | -2.776606E+01 | -5.357321E+01 | 2.709127E+01 | -3.474603E+01 |
| $a_6$ | 2.781613E+01 | 3.006542E+03 | -8.392198E+03 | 6.661750E+03 |
| $a_8$ | 2.095298E+03 | -8.966428E+05 | 9.857383E+05 | -4.701479E+05 |
| $a_{10}$ | -1.862147E+04 | 1.063522E+08 | -3.903498E+07 | 2.009742E+07 |
| $a_{12}$ | 0.000000E+00 | -6.630587E+09 | -2.440684E+09 | -4.737550E+08 |
| $a_{14}$ | 0.000000E+00 | 2.106018E+11 | 2.691772E+11 | 5.286743E+09 |
| $a_{16}$ | 0.000000E+00 | -2.643973E+12 | -6.731509E+12 | -1.447342E+10 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | -6.861552E-01 | 2.633731E+01 | -3.722116E-01 |
| $a_4$ | -1.197082E+02 | -7.863586E+01 | 7.985121E+00 | -3.958786E+00 |
| $a_6$ | 1.301652E+04 | 3.429458E+03 | -4.377746E+02 | 1.091894E+03 |
| $a_8$ | -1.256002E+06 | -1.396662E+05 | 4.099466E+04 | -7.259851E+04 |
| $a_{10}$ | 8.372430E+07 | 3.886319E+06 | -2.612319E+06 | 2.901658E+06 |
| $a_{12}$ | -3.726905E+09 | -6.723369E+07 | 9.033331E+07 | -7.143334E+07 |
| $a_{14}$ | 1.085913E+11 | 6.504065E+08 | -1.782624E+09 | 1.094946E+09 |
| $a_{16}$ | -1.987014E+12 | -2.382082E+09 | 2.026066E+10 | -1.017008E+10 |
| $a_{18}$ | 2.067125E+13 | -1.014317E+10 | -1.239045E+11 | 5.250736E+10 |
| $a_{20}$ | -9.294064E+13 | 8.625891E+10 | 3.155830E+11 | -1.160221E+11 |

FIG. 51

| Eleventh Embodiment |||||||
|---|---|---|---|---|---|---|
| EFL=0.454mm, HFOV=70.035 Degrees, TTL=1.343mm, Fno=2.050, ImgH=0.429mm |||||||
| No. | | Radius of curvature (mm) | Aperture Stop Distance/ Thickness/ Air Gap (mm) | | Refractive index | Abbe No. | Focal length (mm) |
| | Object | INFINITY | INFINITY | | | | |
| 11 | First Lens element | 0.309 | 0.126 | T1 | 1.535 | 55.690 | -0.579 |
| 12 | | 0.133 | 0.138 | G12 | | | |
| 80 | Ape. Stop | INFINITY | -0.008 | | | | |
| 21 | Second Lens element | 0.657 | 0.230 | T2 | 1.535 | 55.690 | 0.315 |
| 22 | | -0.199 | 0.020 | G23 | | | |
| 31 | Third Lens element | 0.843 | 0.099 | T3 | 1.661 | 20.373 | -0.467 |
| 32 | | 0.217 | 0.045 | G34 | | | |
| 41 | Fourth Lens element | 1.654 | 0.240 | T4 | 1.535 | 55.690 | 0.488 |
| 42 | | -0.296 | 0.050 | G4F | | | |
| 90 | Filter | INFINITY | 0.210 | | 1.517 | 64.167 | |
| | | INFINITY | 0.193 | | | | |
| 91 | Image Plane | INFINITY | | | | | |

FIG. 52

| No. | 11 | 12 | 21 | 22 |
|---|---|---|---|---|
| K | 0.000000E+00 | -4.370962E-01 | 1.308902E+01 | -8.253002E-02 |
| $a_4$ | -1.397909E+01 | -3.845097E+01 | 1.010722E+02 | 3.206131E+01 |
| $a_6$ | -4.019673E+02 | 6.400977E+03 | -3.390015E+04 | -5.370209E+03 |
| $a_8$ | 6.956486E+03 | -2.041451E+06 | 5.641221E+06 | 6.444698E+05 |
| $a_{10}$ | -4.022797E+04 | 2.384922E+08 | -5.485417E+08 | -3.762797E+07 |
| $a_{12}$ | 0.000000E+00 | -1.411121E+10 | 3.092885E+10 | 1.202363E+09 |
| $a_{14}$ | 0.000000E+00 | 4.168898E+11 | -9.381067E+11 | -2.014423E+10 |
| $a_{16}$ | 0.000000E+00 | -4.850698E+12 | 1.180858E+13 | 1.397759E+11 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | -6.917493E-01 | 2.494020E+01 | -4.022771E-01 |
| $a_4$ | -9.437406E+01 | -8.566447E+01 | 4.717754E+00 | 2.409025E+01 |
| $a_6$ | 1.115499E+04 | 3.566352E+03 | 4.913502E+02 | -1.776753E+03 |
| $a_8$ | -1.431774E+06 | -1.601790E+05 | -7.223881E+04 | 9.024638E+04 |
| $a_{10}$ | 1.185117E+08 | 6.039526E+06 | 3.553274E+06 | -2.745256E+06 |
| $a_{12}$ | -5.906193E+09 | -1.596908E+08 | -9.329417E+07 | 5.130399E+07 |
| $a_{14}$ | 1.774040E+11 | 2.719154E+09 | 1.442009E+09 | -5.884092E+08 |
| $a_{16}$ | -3.140162E+12 | -2.820865E+10 | -1.317424E+10 | 3.977296E+09 |
| $a_{18}$ | 3.000641E+13 | 1.618617E+11 | 6.599150E+10 | -1.414630E+10 |
| $a_{20}$ | -1.184967E+14 | -3.936112E+11 | -1.400873E+11 | 1.943071E+10 |

FIG. 53

| No. | | Radius of curvature (mm) | Aperture Stop Distance/ Thickness/ Air Gap (mm) | | Refractive index | Abbe No. | Focal length (mm) |
|---|---|---|---|---|---|---|---|
| | Twelfth Embodiment |||||||
| | EFL=0.415mm, HFOV=54.926 Degrees, TTL=1.032mm, Fno=2.000, ImgH=0.343mm |||||||
| | Object | INFINITY | INFINITY | | | | |
| 11 | First Lens element | 0.302 | 0.115 | T1 | 1.535 | 55.690 | -0.586 |
| 12 | | 0.134 | 0.167 | G12 | | | |
| 80 | Ape. Stop | INFINITY | -0.015 | | | | |
| 21 | Second Lens element | 0.484 | 0.172 | T2 | 1.535 | 55.690 | 0.312 |
| 22 | | -0.224 | 0.008 | G23 | | | |
| 31 | Third Lens element | 0.305 | 0.034 | T3 | 1.661 | 20.373 | 548669044.294 |
| 32 | | 0.291 | 0.010 | G34 | | | |
| 41 | Fourth Lens element | 1.176 | 0.118 | T4 | 1.535 | 55.690 | -5.506 |
| 42 | | 0.812 | 0.050 | G4F | | | |
| 90 | Filter | INFINITY | 0.210 | | 1.517 | 64.167 | |
| | | INFINITY | 0.163 | | | | |
| 91 | Image Plane | INFINITY | | | | | |

FIG. 54

| No. | 11 | 12 | 21 | 22 |
|---|---|---|---|---|
| K | 0.000000E+00 | -2.292895E-01 | 7.086365E+00 | 1.730058E-01 |
| $a_4$ | -5.437743E+00 | 3.843857E+01 | 1.599273E+01 | -4.664172E+00 |
| $a_6$ | -1.233220E+03 | -2.074114E+04 | -8.856997E+03 | 1.250472E+03 |
| $a_8$ | 3.893323E+04 | 2.810862E+06 | 1.503545E+06 | 1.041005E+03 |
| $a_{10}$ | -6.702265E+05 | -2.356091E+08 | -1.496388E+08 | -5.376448E+06 |
| $a_{12}$ | 5.903778E+06 | 1.142194E+10 | 8.450062E+09 | 3.383036E+08 |
| $a_{14}$ | -2.072362E+07 | -2.973261E+11 | -2.536975E+11 | -8.585167E+09 |
| $a_{16}$ | 3.312308E+06 | 3.112124E+12 | 3.129732E+12 | 8.156906E+10 |
| $a_{18}$ | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 |
| No. | 31 | 32 | 41 | 42 |
| K | 0.000000E+00 | 5.236812E-01 | -9.845880E+01 | 6.431888E+00 |
| $a_4$ | -7.533805E+01 | -7.696864E+01 | 2.553361E+01 | 1.582431E+01 |
| $a_6$ | 9.232176E+02 | 2.805144E+03 | -6.969717E+02 | -1.046389E+03 |
| $a_8$ | 1.666612E+05 | -1.053397E+05 | 4.732370E+03 | 7.129166E+04 |
| $a_{10}$ | -1.492299E+07 | 4.111221E+06 | 2.216485E+06 | -3.325038E+06 |
| $a_{12}$ | 5.926588E+08 | -9.631218E+07 | -1.058713E+08 | 9.718647E+07 |
| $a_{14}$ | -1.188256E+10 | 1.383382E+09 | 2.336254E+09 | -1.772243E+09 |
| $a_{16}$ | 9.054645E+10 | -1.464815E+10 | -3.165454E+10 | 1.854633E+10 |
| $a_{18}$ | 5.576063E+11 | 6.509854E+10 | 2.442061E+11 | -7.151648E+10 |
| $a_{20}$ | -1.074281E+13 | -3.541228E+11 | -6.315418E+11 | -2.177347E+11 |

FIG. 55

| Thirteenth Embodiment ||||||||
|---|---|---|---|---|---|---|---|
| EFL=0.442mm, HFOV=60.021 Degrees, TTL=1.649mm, Fno=2.448, ImgH=0.354mm ||||||||
| No. | | Radius of curvature (mm) | Aperture Stop Distance/ Thickness/ Air Gap (mm) | | Refractive index | Abbe No. | Focal length (mm) |
| | Object | INFINITY | INFINITY | | | | |
| 11 | First Lens element | 1.211 | 0.171 | T1 | 1.545 | 55.987 | -0.554 |
| 12 | | 0.230 | 0.469 | G12 | | | |
| 80 | Ape. Stop | INFINITY | -0.025 | | | | |
| 21 | Second Lens element | 0.402 | 0.190 | T2 | 1.535 | 55.690 | 0.324 |
| 22 | | -0.256 | 0.043 | G23 | | | |
| 31 | Third Lens element | -2.165 | 0.065 | T3 | 1.661 | 20.373 | -0.644 |
| 32 | | 0.543 | 0.015 | G34 | | | |
| 41 | Fourth Lens element | 1.431 | 0.122 | T4 | 1.535 | 55.690 | 4.190 |
| 42 | | 3.813 | 0.050 | G4F | | | |
| 90 | Filter | INFINITY | 0.210 | | 1.517 | 64.167 | |
| | | INFINITY | 0.339 | | | | |
| 91 | Image Plane | INFINITY | | | | | |

FIG. 56

| No. | 11 | 12 | 21 | 22 |
|---|---|---|---|---|
| K | 0.000000E+00 | 0.000000E+00 | 0.000000E+00 | 0.000000E+00 |
| $a_4$ | -4.180353E+00 | -1.504499E-01 | -1.325125E+00 | 2.299929E+01 |
| $a_6$ | -2.343338E+01 | -6.852187E+02 | -8.575434E+01 | -4.497703E+02 |
| $a_8$ | 3.469248E+02 | 1.495872E+04 | -8.937219E+02 | 8.934096E+03 |
| $a_{10}$ | -1.039389E+03 | -1.588660E+05 | 1.354168E+02 | -1.129837E+05 |
| $a_{12}$ | 0.000000E+00 | 0.000000E+00 | -7.163247E+05 | -5.170845E+05 |
| $a_{14}$ | 0.000000E+00 | 0.000000E+00 | -2.534926E+07 | -3.163311E+06 |
| $a_{16}$ | 0.000000E+00 | 0.000000E+00 | -7.546069E+08 | 2.176266E+08 |
| No. | 31 | 32 | 41 | 42 |
| K | 0.000000E+00 | 0.000000E+00 | 0.000000E+00 | 0.000000E+00 |
| $a_4$ | -2.436101E+01 | -2.707997E+01 | 2.667176E+01 | 1.409527E+01 |
| $a_6$ | -5.939725E+01 | 3.979478E+02 | -1.966013E+02 | 1.627648E+02 |
| $a_8$ | 1.382919E+04 | 5.474993E+03 | 1.891344E+03 | -2.320819E+03 |
| $a_{10}$ | -2.092533E+05 | -9.738104E+04 | -2.808381E+04 | -7.808616E+03 |
| $a_{12}$ | 1.040531E+06 | -2.880405E+05 | -1.129583E+05 | -1.422232E+05 |
| $a_{14}$ | 5.551022E+06 | -6.655548E+06 | -7.417768E+05 | -1.262527E+06 |
| $a_{16}$ | 6.375971E+06 | -1.006922E+08 | -9.649301E+07 | 7.199085E+06 |

FIG. 57

| Embodiment | 1st | 2nd | 3rd | 4th | 5th | 6th | 7th |
|---|---|---|---|---|---|---|---|
| Tavg(μm) | 143 | 166 | 175 | 120 | 184 | 399 | 349 |
| Gmax/Tmin | 1.409 | 4.450 | 1.450 | 5.213 | 5.036 | 1.565 | 1.763 |
| $\|v1-v2\|$ | 0.000 | 0.297 | 0.000 | 0.297 | 0.297 | 0.000 | 0.000 |
| TTL/T2 | 8.323 | 8.700 | 5.925 | 8.700 | 5.490 | 5.205 | 4.574 |
| AAG/Tmin | 2.031 | 5.730 | 1.971 | 7.700 | 7.700 | 1.926 | 2.106 |
| EFL/(G23+T3+G34) | 1.503 | 1.497 | 1.942 | 1.496 | 4.020 | 2.236 | 1.794 |
| (ALT+EFL)/(G12+T3+T4) | 2.159 | 1.333 | 1.996 | 1.650 | 3.101 | 2.088 | 2.054 |
| EFL/Gmax | 1.729 | 0.767 | 2.141 | 1.043 | 2.924 | 1.945 | 1.365 |
| HFOV/(TTL+EFL) | 39.811 | 35.325 | 32.594 | 37.916 | 23.510 | 18.001 | 19.693 |
| TL/(G12+T4) | 2.700 | 1.873 | 2.276 | 2.320 | 2.593 | 2.323 | 2.471 |
| AAG/T1 | 0.905 | 3.500 | 1.971 | 3.488 | 2.156 | 1.425 | 1.204 |
| (EFL+BFL)/(T1+T4) | 1.819 | 2.036 | 2.171 | 3.595 | 3.603 | 1.980 | 1.473 |
| v3+v4 | 76.063 | 76.063 | 71.133 | 74.958 | 76.063 | 76.063 | 76.063 |
| BFL/(G12+G34) | 2.900 | 0.933 | 2.227 | 0.974 | 1.182 | 2.499 | 1.846 |
| HFOV/Fno | 27.361 | 32.218 | 27.500 | 30.638 | 18.678 | 29.550 | 26.835 |
| TL/(G12+G34) | 5.100 | 2.555 | 4.837 | 2.303 | 3.023 | 5.099 | 5.095 |
| ALT/(T1+G34) | 2.637 | 3.235 | 5.000 | 2.065 | 2.389 | 4.595 | 4.092 |
| BFL/(G23+T4) | 2.319 | 1.500 | 1.558 | 2.495 | 2.085 | 1.802 | 1.501 |
| TTL/ImgH | 8.108 | 5.674 | 4.316 | 4.355 | 3.857 | 4.252 | 6.821 |
| (ALT+BFL)/(AAG+EFL) | 2.622 | 1.264 | 1.991 | 0.975 | 0.900 | 2.483 | 2.670 |
| (TTL+EFL)/(Tmax+Tmax2) | 3.966 | 4.818 | 3.596 | 5.684 | 4.925 | 3.268 | 2.991 |
| v1+v2 | 111.380 | 111.677 | 111.380 | 111.677 | 111.677 | 111.380 | 111.380 |

FIG. 58

| Embodiment | 8th | 9th | 10th | 11th | 12th | 13th |
|---|---|---|---|---|---|---|
| Tavg(μm) | 167 | 158 | 170 | 174 | 110 | 137 |
| Gmax/Tmin | 1.001 | 1.400 | 1.324 | 1.308 | 4.429 | 6.806 |
| $|\upsilon 1-\upsilon 2|$ | 0.000 | 18.378 | 0.000 | 0.000 | 0.000 | 0.297 |
| TTL/T2 | 5.865 | 5.424 | 5.762 | 5.827 | 6.011 | 8.699 |
| AAG/Tmin | 1.354 | 2.111 | 1.708 | 1.962 | 4.961 | 7.700 |
| EFL/(G23+T3+G34) | 2.173 | 2.466 | 2.467 | 2.765 | 7.905 | 3.577 |
| (ALT+EFL)/(G12+T3+T4) | 2.335 | 2.463 | 2.166 | 2.449 | 2.810 | 1.567 |
| EFL/Gmax | 2.937 | 3.013 | 2.751 | 3.495 | 2.733 | 0.995 |
| HFOV/(TTL+EFL) | 43.328 | 33.427 | 42.047 | 38.975 | 37.953 | 28.701 |
| TL/(G12+T4) | 2.646 | 2.572 | 2.287 | 2.406 | 2.259 | 1.855 |
| AAG/T1 | 1.298 | 1.782 | 1.708 | 1.552 | 1.476 | 2.943 |
| (EFL+BFL)/(T1+T4) | 2.355 | 2.592 | 2.363 | 2.479 | 3.599 | 3.554 |
| $\upsilon 3+\upsilon 4$ | 76.063 | 76.063 | 76.063 | 76.063 | 76.063 | 76.063 |
| BFL/(G12+G34) | 2.266 | 2.156 | 2.488 | 2.593 | 2.615 | 1.305 |
| HFOV/Fno | 31.818 | 27.495 | 35.042 | 34.163 | 27.463 | 24.518 |
| TL/(G12+G34) | 5.099 | 4.948 | 5.053 | 5.099 | 3.763 | 2.288 |
| ALT/(T1+G34) | 3.887 | 4.240 | 4.999 | 4.085 | 3.506 | 2.949 |
| BFL/(G23+T4) | 1.873 | 1.604 | 1.719 | 1.739 | 3.360 | 3.619 |
| TTL/ImgH | 3.612 | 3.477 | 3.524 | 3.130 | 3.009 | 4.659 |
| (ALT+BFL)/(AAG+EFL) | 1.829 | 1.562 | 1.955 | 1.770 | 1.474 | 1.214 |
| (TTL+EFL)/(Tmax+Tmax2) | 4.078 | 3.994 | 3.632 | 3.818 | 5.000 | 5.804 |
| $\upsilon 1+\upsilon 2$ | 111.380 | 93.001 | 111.380 | 111.380 | 111.380 | 111.677 |

FIG. 59

OPTICAL IMAGING LENS

BACKGROUND OF THE INVENTION

1. Field of the Invention

The present invention generally relates to an optical imaging lens. Specifically speaking, the present invention is directed to an optical imaging lens for using in a portable electronic device such as a mobile phone, a camera, a tablet personal computer, or a personal digital assistant (PDA) for taking pictures or for recording videos. Since the optical imaging lens of the present invention has a smaller volume and a larger field of view, it may also be applied to medical equipment such as an endoscope.

2. Description of the Prior Art

The specifications of consumer electronic products are changing from day to day, not only do they keep becoming lighter and thinner, but also the specifications of key components of electronic products such as optical imaging lenses are improving to meet the requirements of consumers. In addition to the imaging quality and to the volume of optical imaging lenses, it is also important to improve the field of view and the f-number of an optical imaging lens. Therefore, in the field of an optical imaging lens design, it is also necessary to have a compromise between the quality of and performance in addition to the pursuit of thinning of an optical imaging lens.

However, the design of an optical imaging lens is not just to reduce the lens with good imaging quality in equal proportion to yield an optical imaging lens of compromised imaging quality and miniaturization. Practical problems of aspects of production such as manufacture and assembly yield must also be taken into consideration because the design process involves not only the material characteristics, the lens element thickness or the air gap configuration. Therefore, the technical difficulty of miniaturized lens elements is obviously much higher than that of traditional lens elements. It has always been the goal of the continuous improvement in this field to learn how to make optical imaging lens meet the requirements of consumer electronic products and to continuously improve the imaging quality.

SUMMARY OF THE INVENTION

In light of the above, the present invention proposes an optical imaging lens of four lens elements which has smaller Fno, a smaller volume, a larger field of view, excellent imaging quality, good optical performance and is technically possible. The optical imaging lens of four lens elements of the present invention from an object side to an image side in order along an optical axis has a first lens element, a second lens element, a third lens element and a fourth lens element. Each lens element of the first lens element, the second lens element, the third lens element and the fourth lens element in the optical imaging lens of four lens elements of the present invention respectively has an object-side surface which faces toward the object side to allow imaging rays to pass through as well as an image-side surface which faces toward the image side to allow the imaging rays to pass through.

In one embodiment of the present invention, an optical axis region of the object-side surface of the second lens element is convex, an optical axis region of the image-side surface of the third lens element is concave and lens elements included by the optical imaging lens are only the four lens elements described above to satisfy the relationships: Tavg≤350 μm, Gmax/Tmin≥1.000, Tmax−T2≤λ; λ=0 when T2=Tmax, and λ=90 μm if T2≠Tmax.

In another embodiment of the present invention, the first lens element has negative refracting power and an optical axis region of the object-side surface of the first lens element is convex, an optical axis region of the image-side surface of the third lens element is concave and lens elements included by the optical imaging lens are only the four lens elements described above to satisfy the relationships: Tavg≤400 μm, Tmax−T2≤λ, T3−Tmin≤δ; λ=0 when T2=Tmax, λ=90 μm if T2≠Tmax, δ=0 when T3=Tmin, and δ=150 μm if T3≠Tmin.

In another embodiment of the present invention, an optical axis region of the object-side surface of the first lens element is convex, an optical axis region of the image-side surface of the third lens element is concave and lens elements included by the optical imaging lens are only the four lens elements described above to satisfy the relationships: Tavg≤300 μm, and |υ1−υ2|≤30.000.

In the optical imaging lens of the present invention, the embodiments may also selectively satisfy the following optical relationships:

1. TTL/T2≤8.700;
2. AAG/Tmin≤7.700;
3. EFL/(G23+T3+G34)≥1.490;
4. (ALT+EFL)/(G12+T3+T4)≤3.200;
5. EFL/Gmax≤3.500;
6. HFOV/(TTL+EFL)≥18.000 degrees/mm;
7. TL/(G12+T4)≤2.700;
8. AAG/T1≤3.500;
9. (EFL+BFL)/(T1+T4)≤3.700;
10. υ3+υ4≥70.000;
11. BFL/(G12+G34)≤2.900;
12. HFOV/Fno≥18.500 degrees;
13. TL/(G12+G34)≤5.100;
14. ALT/(T1+G34)≤5.000;
15. BFL/(G23+T4)≥1.500;
16. TTL/ImgH≥3.000;
17. (ALT+BFL)/(AAG+EFL)≥0.900;
18. (TTL+EFL)/(Tmax+Tmax2)≤5.850;
19. G12≤ALT;
20. υ1+υ2≥93.000.

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis. AAG is a sum of three air gaps from the first lens element to the fourth lens element along the optical axis, i.e. a sum of G12, G23 and G34; ALT is a sum of the thicknesses of four lens elements from the first lens element to the fourth lens element along the optical axis, i.e. a sum of T1, T2, T3 and T4; Tmax is the largest thickness of four lens elements from the first lens element to the fourth lens element along the optical axis, that is, the largest thickness of T1, T2, T3 and T4; Tmax2 is the second largest thickness of four lens elements from the first lens element to the fourth lens element along the optical axis, that is, the second largest thickness of T1, T2, T3 and T4; Tmin is the smallest thickness of four lens elements from the first lens element to the fourth lens element along the optical axis, that is, the smallest thickness of T1, T2, T3 and T4; Tavg is an average of four thicknesses from the first lens element to the fourth lens element along the optical axis, that is, an average of T1, T2, T3 and T4; Gmax is the largest value of three air gaps from the first lens element to the fourth lens element along the optical axis, that is, the largest air gap of G12, G23 and G34; TL is a distance from the object-side surface of the first lens element to the image-side surface of the fourth lens element along the optical axis; TTL is a distance from the object-side surface of the first lens element to an image plane along the optical axis, namely a system length of the optical imaging lens; BFL is a distance from the image-side surface of the fourth lens element to the image plane along the optical axis; EFL is an effective focal length of the optical imaging lens; ImgH is an image height of the optical imaging lens, and Fno is a f-number of the optical imaging lens.

Besides, an Abbe number of the first lens element is υ1; an Abbe number of the second lens element is υ2; an Abbe number of the third lens element is υ3; an Abbe number of the fourth lens element is υ4.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrate the methods for determining the surface shapes and for determining optical axis region or periphery region of one lens element.

FIG. 6 illustrates a first embodiment of the optical imaging lens of the present invention.

FIG. 7A illustrates the longitudinal spherical aberration on the image plane of the first embodiment.

FIG. 7B illustrates the field curvature aberration on the sagittal direction of the first embodiment.

FIG. 7C illustrates the field curvature aberration on the tangential direction of the first embodiment.

FIG. 7D illustrates the distortion aberration of the first embodiment.

FIG. 10 illustrates a third embodiment of the optical imaging lens of the present invention.

FIG. 11A illustrates the longitudinal spherical aberration on the image plane of the third embodiment.

FIG. 11B illustrates the field curvature aberration on the sagittal direction of the third embodiment.

FIG. 11C illustrates the field curvature aberration on the tangential direction of the third embodiment.

FIG. 11D illustrates the distortion aberration of the third embodiment.

FIG. 14 illustrates a fifth embodiment of the optical imaging lens of the present invention.

FIG. 15A illustrates the longitudinal spherical aberration on the image plane of the fifth embodiment.

FIG. 15B illustrates the field curvature aberration on the sagittal direction of the fifth embodiment.

FIG. 15C illustrates the field curvature aberration on the tangential direction of the fifth embodiment.

FIG. 15D illustrates the distortion aberration of the fifth embodiment.

FIG. 28 illustrates a twelfth embodiment of the optical imaging lens of the present invention.

FIG. 29A illustrates the longitudinal spherical aberration on the image plane of the twelfth embodiment.

FIG. 29B illustrates the field curvature aberration on the sagittal direction of the twelfth embodiment.

FIG. 29C illustrates the field curvature aberration on the tangential direction of the twelfth embodiment.

FIG. 29D illustrates the distortion aberration of the twelfth embodiment.

FIG. 32 shows the optical data of the first embodiment of the optical imaging lens.

FIG. 33 shows the aspheric surface data of the first embodiment.

FIG. 34 shows the optical data of the second embodiment of the optical imaging lens.

FIG. 35 shows the aspheric surface data of the second embodiment.

FIG. 36 shows the optical data of the third embodiment of the optical imaging lens.

FIG. 37 shows the aspheric surface data of the third embodiment.

FIG. 38 shows the optical data of the fourth embodiment of the optical imaging lens.

FIG. 39 shows the aspheric surface data of the fourth embodiment.

FIG. 40 shows the optical data of the fifth embodiment of the optical imaging lens.

FIG. 41 shows the aspheric surface data of the fifth embodiment.

FIG. 42 shows the optical data of the sixth embodiment of the optical imaging lens.

FIG. 43 shows the aspheric surface data of the sixth embodiment.

FIG. 44 shows the optical data of the seventh embodiment of the optical imaging lens.

FIG. 45 shows the aspheric surface data of the seventh embodiment.

FIG. 46 shows the optical data of the eighth embodiment of the optical imaging lens.

FIG. 47 shows the aspheric surface data of the eighth embodiment.

FIG. 48 shows the optical data of the ninth embodiment of the optical imaging lens.

FIG. 49 shows the aspheric surface data of the ninth embodiment.

FIG. 50 shows the optical data of the tenth embodiment of the optical imaging lens.

FIG. 51 shows the aspheric surface data of the tenth embodiment.

FIG. 52 shows the optical data of the eleventh embodiment of the optical imaging lens.

FIG. 53 shows the aspheric surface data of the eleventh embodiment.

FIG. 54 shows the optical data of the twelfth embodiment of the optical imaging lens.

FIG. 55 shows the aspheric surface data of the twelfth embodiment.

FIG. 56 shows the optical data of the thirteenth embodiment of the optical imaging lens.

FIG. 57 shows the aspheric surface data of the thirteenth embodiment.

FIG. 58 and FIG. 59 show some important parameters and ratios in the embodiments.

DETAILED DESCRIPTION

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
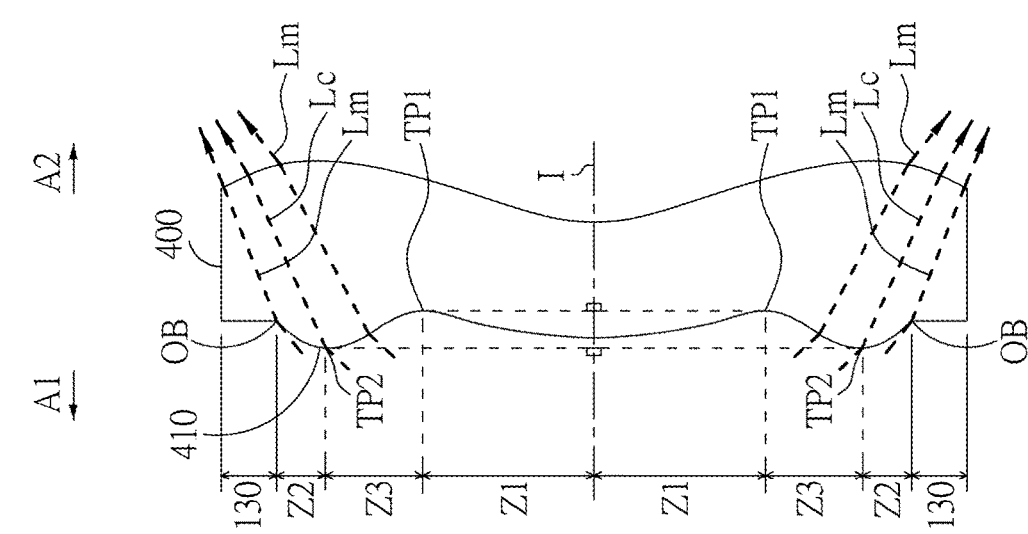

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 3:
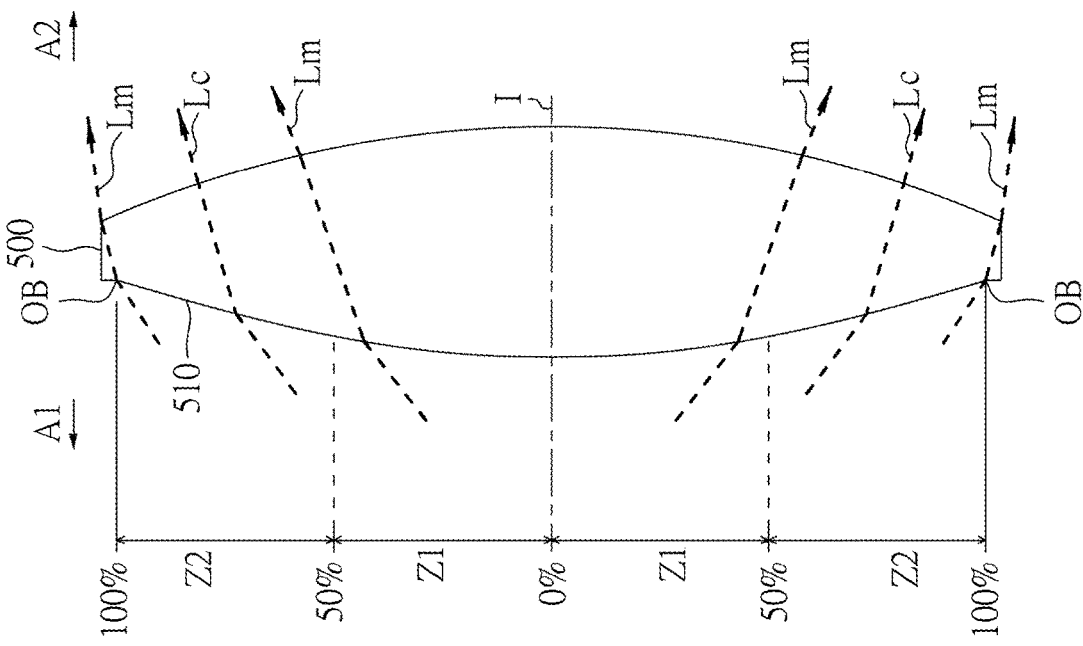
Figure 5:
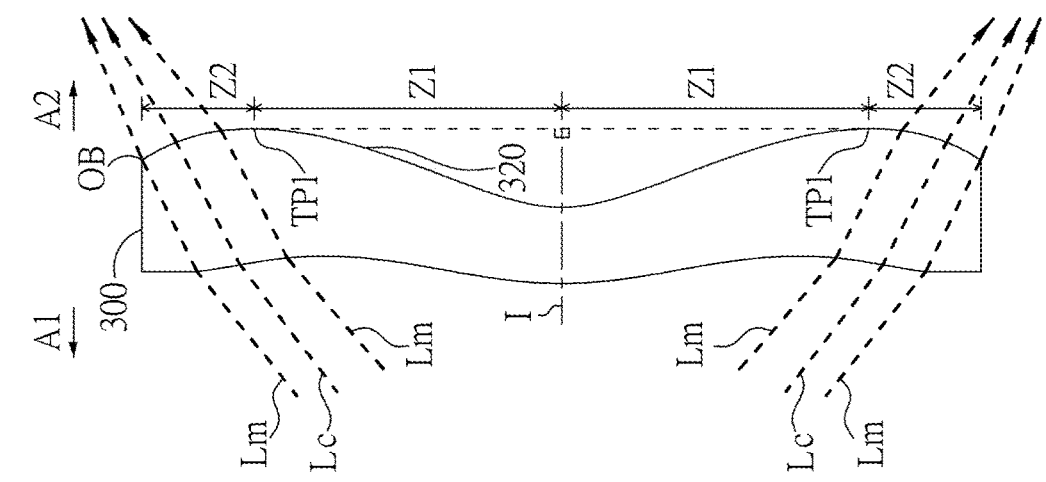

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

As shown in FIG. 6, the optical imaging lens 1 of four lens elements of the present invention, sequentially located from an object side A1 (where an object is located) to an image side A2 along an optical axis I, has a first lens element 10, an aperture stop (ape. stop) 80, a second lens element 20, a third lens element 30, a fourth lens element 40 and an image plane 91. Generally speaking, the first lens element 10, the second lens element 20, the third lens element 30 and the fourth lens element 40 may be made of a transparent plastic material but the present invention is not limited to this. Each has an appropriate refracting power. In the optical imaging lens 1 of the present invention, lens elements having refracting power included by the optical imaging lens 1 are only the first lens element 10, the second lens element 20, the third lens element 30 and the fourth lens element 40, the four lens elements, described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. In FIG. 6, the aperture stop 80 is disposed between the first lens element 10 and the second lens element 20. When light emitted or reflected by an object (not shown) which is located at the object side A1 enters the optical imaging lens 1 of the present invention, it forms a clear and sharp image on the image plane 91 at the image side A2 after passing through the first lens element 10, the aperture stop 80, the second lens element 20, the third lens element 30, the fourth lens element 40 and the filter 90. In embodiments of the present invention, the filter 90 may be a filter of various suitable functions, for example, the filter 90 may be an infrared cut-off filter (IR cut filter), placed between the fourth lens element 40 and the image plane 91, to keep the infrared light in the imaging rays from reaching the image plane 91 to jeopardize the imaging quality.

Each lens element in the optical imaging lens 1 of the present invention has an object-side surface facing toward the object side A1 and allowing imaging rays to pass through as well as an image-side surface facing toward the image side A2 and allowing the imaging rays to pass through. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4. Therefore, the sum of the thicknesses of four lens elements from the first lens element 10 to the fourth lens element 40 in the optical imaging lens 1 along the optical axis I is ALT. That is, ALT=T1+T2+T3+T4.

In addition, between two adjacent lens elements in the optical imaging lens 1 of the present invention there may be an air gap along the optical axis I. For example, there is an air gap G12 between the first lens element 10 and the second lens element 20, an air gap G23 between the second lens element 20 and the third lens element 30, and an air gap G34 between the third lens element 30 and the fourth lens element 40. Therefore, the sum of three air gaps from the first lens element 10 to the fourth lens element 40 along the optical axis I is AAG. That is, AAG=G12+G23+G34.

In addition, a distance from the object-side surface 11 of the first lens element 10 to the image plane 91 along the optical axis I is TTL, namely a system length of the optical imaging lens 1; an effective focal length of the optical imaging lens 1 is EFL; a distance from the object-side surface 11 of the first lens element 10 to the image-side surface 42 of the fourth lens element 40 along the optical axis I is TL; HFOV stands for the half field of view which is half of the field of view of the entire optical imaging lens 1; ImgH is an image height of the optical imaging lens 1, and Fno is a f-number of the optical imaging lens 1.

When the filter 90 is placed between the fourth lens element 40 and the image plane 91, an air gap between the fourth lens element 40 and the filter 90 along the optical axis I is G4F; a thickness of the filter 90 along the optical axis I is TF; an air gap between the filter 90 and the image plane 91 along the optical axis I is GFP; and a distance from the image-side surface 42 of the fourth lens element 40 to the image plane 91 along the optical axis I is a back focal length, BFL. Therefore, BFL=G4F+TF+GFP.

Furthermore, a focal length of the first lens element 10 is f1; a focal length of the second lens element 20 is f2; a focal length of the third lens element 30 is f3; a focal length of the fourth lens element 40 is f4; a refractive index of the first lens element 10 is n1; a refractive index of the second lens element 20 is n2; a refractive index of the third lens element 30 is n3; a refractive index of the fourth lens element 40 is n4; an Abbe number of the first lens element 10 is υ1; an Abbe number of the second lens element 20 is υ2; an Abbe number of the third lens element 30 is υ3; and an Abbe number of the fourth lens element 40 is υ4.

In the present invention, it is further defined: Tmax is the largest thickness of four lens elements from the first lens element 10 to the fourth lens element 40 along the optical axis I, that is, the largest thickness of T1, T2, T3 and T4; Tmax2 is the second largest thickness of four lens elements from the first lens element 10 to the fourth lens element 40 along the optical axis I, that is, the second largest thickness of T1, T2, T3 and T4; Tmin is the smallest thickness of four lens elements from the first lens element 10 to the fourth lens element 40 along the optical axis I, that is, the smallest thickness of T1, T2, T3 and T4; Tavg is an average of four thicknesses from the first lens element 10 to the fourth lens element 40 along the optical axis I, that is, an average of T1, T2, T3 and T4; Gmax is the largest value of three air gaps from the first lens element 10 to the fourth lens element 40 along the optical axis I, that is, the largest air gap of G12, G23 and G34.

First Embodiment

Please refer to FIG. 6 which illustrates the first embodiment of the optical imaging lens 1 of the present invention. Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion in each embodiment stands for "image height" (ImgH), and the image height in the first embodiment is 0.144 mm.

Lens elements in the optical imaging lens 1 of the first embodiment are only the four lens elements 10, 20, 30 and 40 with refracting power. The optical imaging lens 1 also has an aperture stop 80 and an image plane 91. The aperture stop 80 is provided between the first lens element 10 and the second lens element 20.

The first lens element 10 has negative refracting power. An optical axis region 13 of the object-side surface 11 of the first lens element 10 is convex, and a periphery region 14 of the object-side surface 11 of the first lens element 10 is concave. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has positive refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is convex, and a periphery region 27 of the image-side surface 22 of the second lens element 20 is convex. Besides, both the object-side surface 21 and the image-side surface 22 of the second lens element 20 are aspheric surfaces, but it is not limited thereto.

The third lens element 30 has negative refracting power. An optical axis region 33 of the object-side surface 31 of the third lens element 30 is concave, and a periphery region 34 of the object-side surface 31 of the third lens element 30 is concave. An optical axis region 36 of the image-side surface 32 of the third lens element 30 is concave, and a periphery region 37 of the image-side surface 32 of the third lens element 30 is concave. Besides, both the object-side surface 31 and the image-side surface 32 of the third lens element 30 are aspheric surfaces, but it is not limited thereto.

The fourth lens element 40 has positive refracting power. An optical axis region 43 of the object-side surface 41 of the fourth lens element 40 is convex, and a periphery region 44 of the object-side surface 41 of the fourth lens element 40 is convex. An optical axis region 46 of the image-side surface 42 of the fourth lens element 40 is convex, and a periphery region 47 of the image-side surface 42 of the fourth lens element 40 is convex. Besides, both the object-side surface 41 and the image-side surface 42 of the fourth lens element 40 are aspheric surfaces, but it is not limited thereto.

In the first lens element 10, the second lens element 20, the third lens element 30 and the fourth lens element 40 of the optical imaging lens 1 of the present invention, there are 8 surfaces, such as the object-side surfaces 11/21/31/41 and the image-side surfaces 12/22/32/42. If a surface is aspheric, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
Y represents a perpendicular distance from a point on the aspheric surface to the optical axis;
Z represents the depth of an aspheric surface (the perpendicular distance between the point of the aspheric surface at a distance Y from the optical axis and the tangent plane of the vertex of the aspheric surface on the optical axis);
R represents the radius of curvature of the lens element surface;
K is a conic constant; and
$a_i$ is the aspheric coefficient of the $i^{th}$ order.

The optical data of the first embodiment of the optical imaging lens 1 are shown in FIG. 32 while the aspheric surface data are shown in FIG. 33. In the present embodiment and in the following embodiments of the optical imaging lens, the second-order aspheric coefficients $\alpha_2$ are all 0. In the following embodiments of the optical imaging lens, the f-number of the entire optical imaging lens is Fno, EFL is the effective focal length, HFOV stands for the half field of view which is half of the field of view of the entire optical imaging lens, and the unit for the radius of curvature, for the thickness and for the focal length is in millimeters (mm). In this embodiment, EFL=0.207 mm; HFOV=54.721 degrees; TTL=1.168 mm; Fno=2.000; ImgH=0.144 mm.

Second Embodiment

Figure 8:
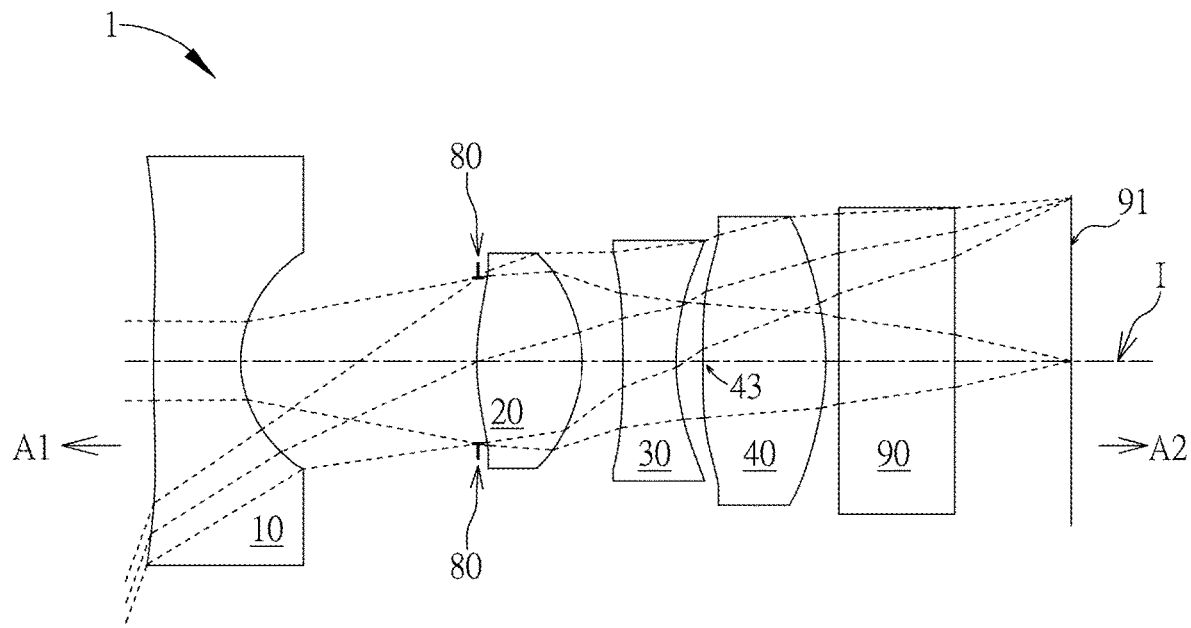
FIG. 8 illustrates a second embodiment of the optical imaging lens of the present invention.
Figures 9A, 9B, 9C, 9D:
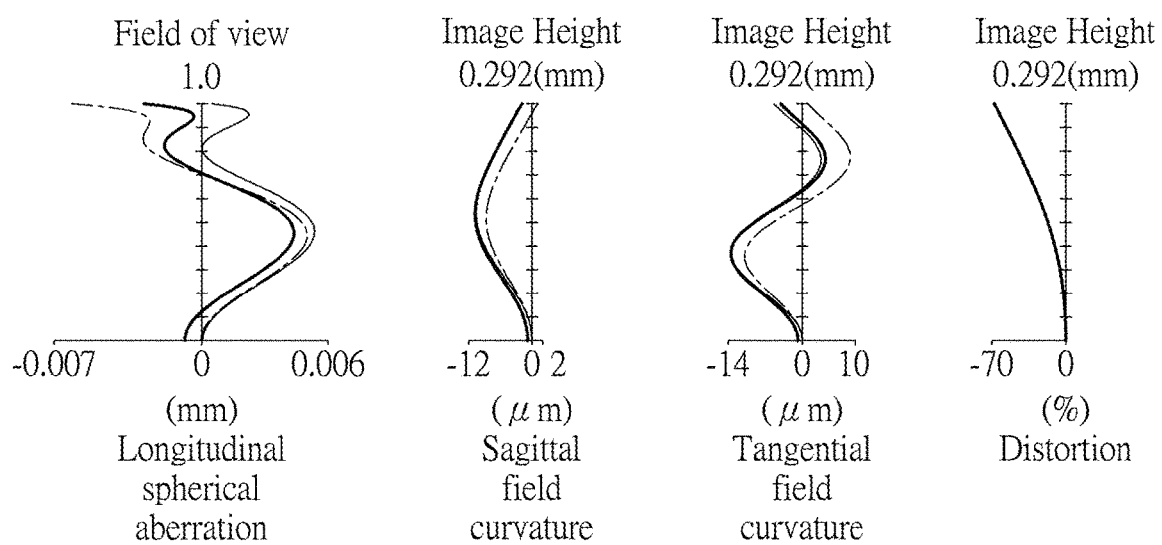
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion aberration of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the optical axis region and the periphery region will be omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 43 of the object-side surface 41 of the fourth lens element 40 is concave.

The optical data of the second embodiment of the optical imaging lens are shown in FIG. 34 while the aspheric surface data are shown in FIG. 35. In this embodiment, EFL=0.327 mm; HFOV=70.074 degrees; TTL=1.657 mm; Fno=2.175; ImgH=0.292 mm. In particular: 1. the field curvature aberration on the sagittal direction in this embodiment is better than the field curvature aberration on the sagittal direction in the first embodiment; 2. the field curvature aberration on the tangential direction in this embodiment is better than the field curvature aberration on the tangential direction in the first embodiment.

Third Embodiment

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 14 of the object-side surface 11 of the first lens element 10 is convex, the optical axis region 33 of the object-side surface 31 of the third lens element 30 is convex and the periphery region 44 of the object-side surface 41 of the fourth lens element 40 is concave.

The optical data of the third embodiment of the optical imaging lens are shown in FIG. 36 while the aspheric surface data are shown in FIG. 37. In this embodiment, EFL=0.345 mm; HFOV=55.000 degrees; TTL=1.342 mm; Fno=2.000; ImgH=0.311 mm. In particular: the distortion aberration of the optical imaging lens in this embodiment is better than that of the optical imaging lens in the first embodiment.

Fourth Embodiment

Figure 12:
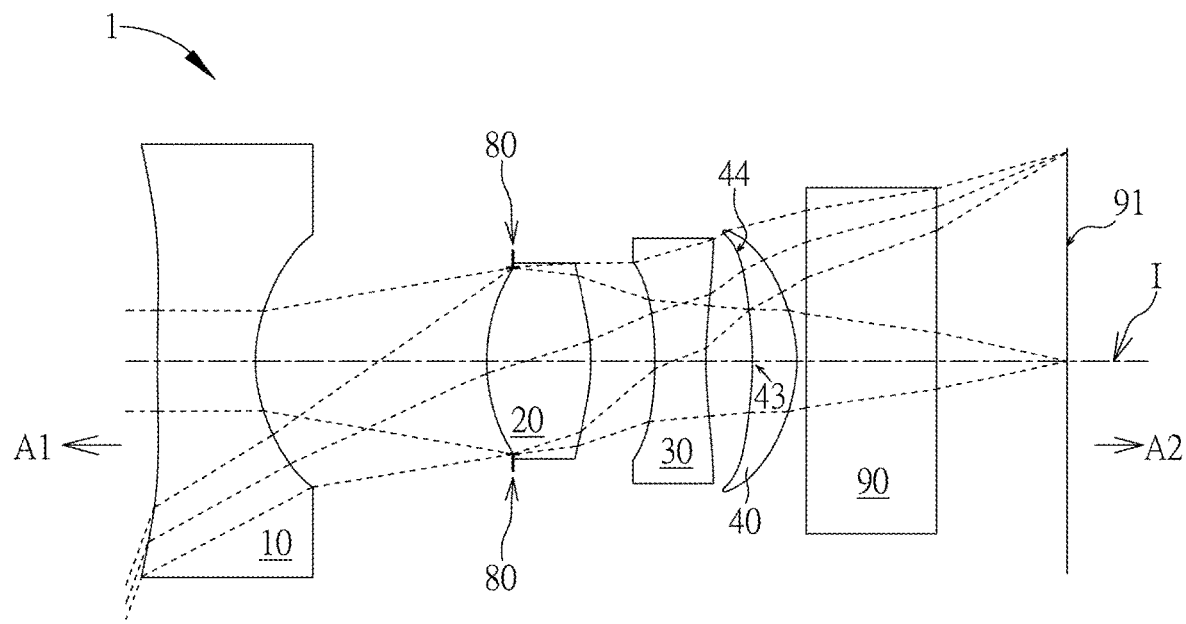
FIG. 12 illustrates a fourth embodiment of the optical imaging lens of the present invention.
Figures 13A, 13B, 13C, 13D:
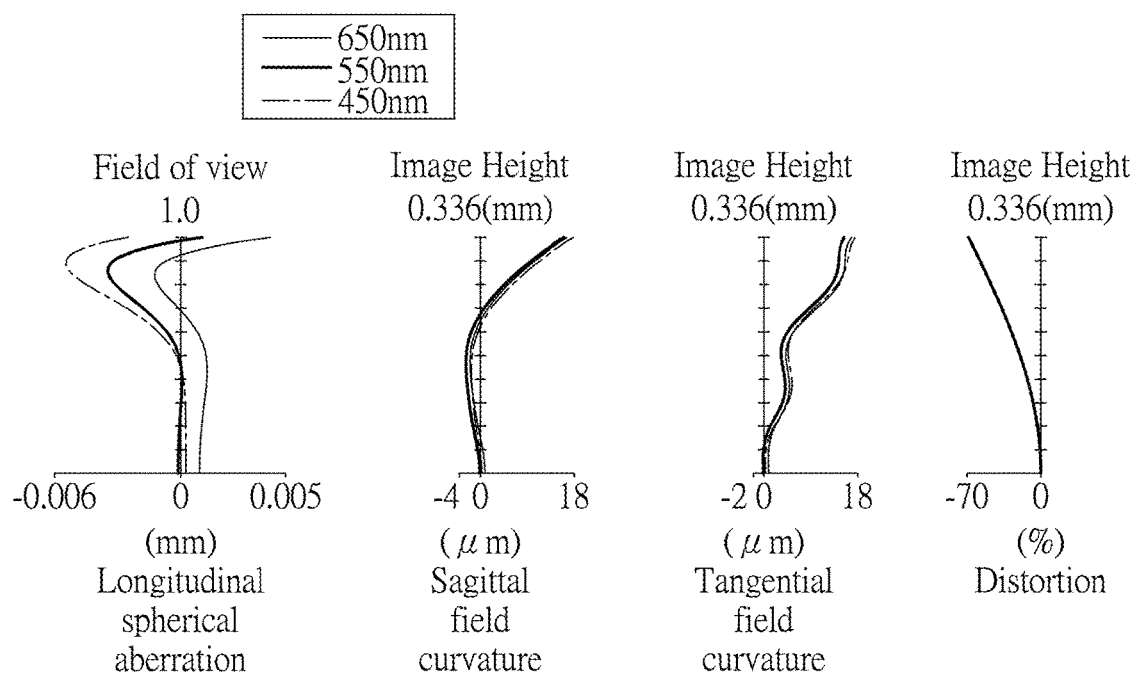
FIG. 13A illustrates the longitudinal spherical aberration on the image plane of the fourth embodiment.
FIG. 13B illustrates the field curvature aberration on the sagittal direction of the fourth embodiment.
FIG. 13C illustrates the field curvature aberration on the tangential direction of the fourth embodiment.
FIG. 13D illustrates the distortion aberration of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 43 of the object-side surface 41 of the fourth lens element 40 is concave and the periphery region 44 of the object-side surface 41 of the fourth lens element 40 is concave.

The optical data of the fourth embodiment of the optical imaging lens are shown in FIG. 38 while the aspheric surface data are shown in FIG. 39. In this embodiment, EFL=0.388 mm; HFOV=70.192 degrees; TTL=1.463 mm; Fno=2.291; ImgH=0.336 mm. In particular: 1. the longitudinal spherical aberration in this embodiment is better than the longitudinal spherical aberration in the first embodiment.

Fifth Embodiment

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 37 of the image-side surface 32 of the third lens element 30 is convex and the optical axis region 43 of the object-side surface 41 of the fourth lens element 40 is concave.

The optical data of the fifth embodiment of the optical imaging lens are shown in FIG. 40 while the aspheric surface data are shown in FIG. 41. In this embodiment, EFL=0.880 mm; HFOV=59.863 degrees; TTL=1.666 mm; Fno=3.205; ImgH=0.432 mm.

Sixth Embodiment

Figure 16:
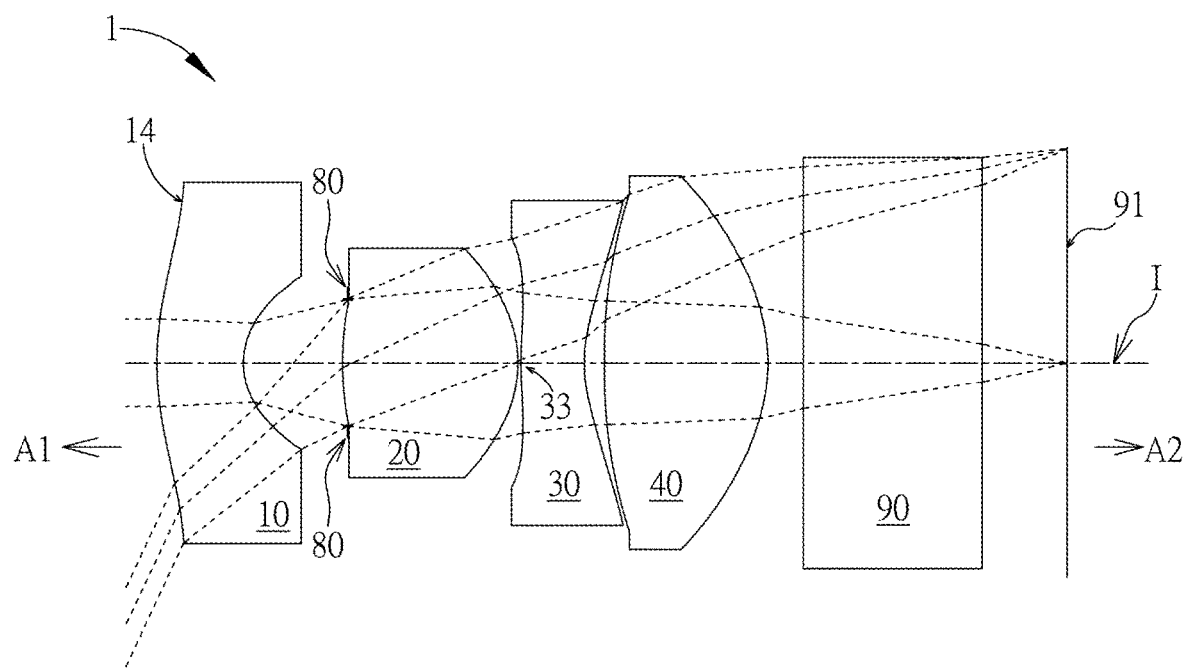
FIG. 16 illustrates a sixth embodiment of the optical imaging lens of the present invention.
Figures 17A, 17B, 17C, 17D:
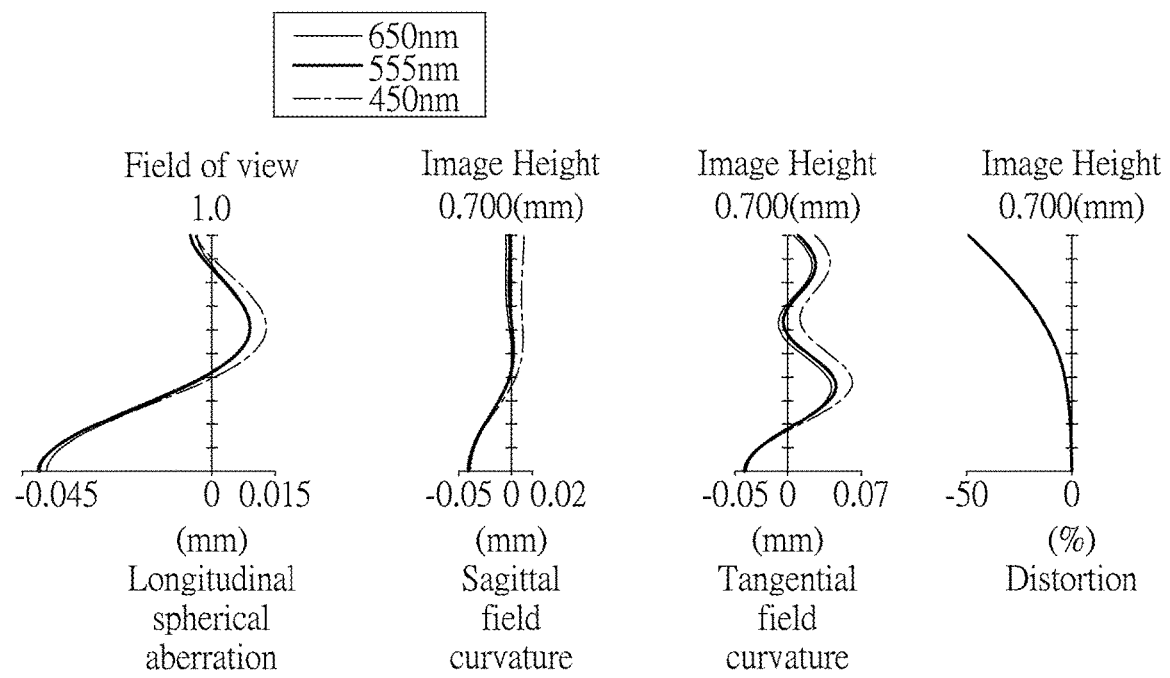
FIG. 17A illustrates the longitudinal spherical aberration on the image plane of the sixth embodiment.
FIG. 17B illustrates the field curvature aberration on the sagittal direction of the sixth embodiment.
FIG. 17C illustrates the field curvature aberration on the tangential direction of the sixth embodiment.
FIG. 17D illustrates the distortion aberration of the sixth embodiment.

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 14 of the object-side surface 11 of the first lens element 10 is convex and the optical axis region 33 of the object-side surface 31 of the third lens element 30 is convex.

The optical data of the sixth embodiment of the optical imaging lens are shown in FIG. 42 while the aspheric surface data are shown in FIG. 43. In this embodiment, EFL=0.635 mm; HFOV=65.010 degrees; TTL=2.977 mm; Fno=2.200; ImgH=0.700 mm. In particular: the distortion aberration of the optical imaging lens in this embodiment is better than that of the optical imaging lens in the first embodiment.

Seventh Embodiment

Figure 18:
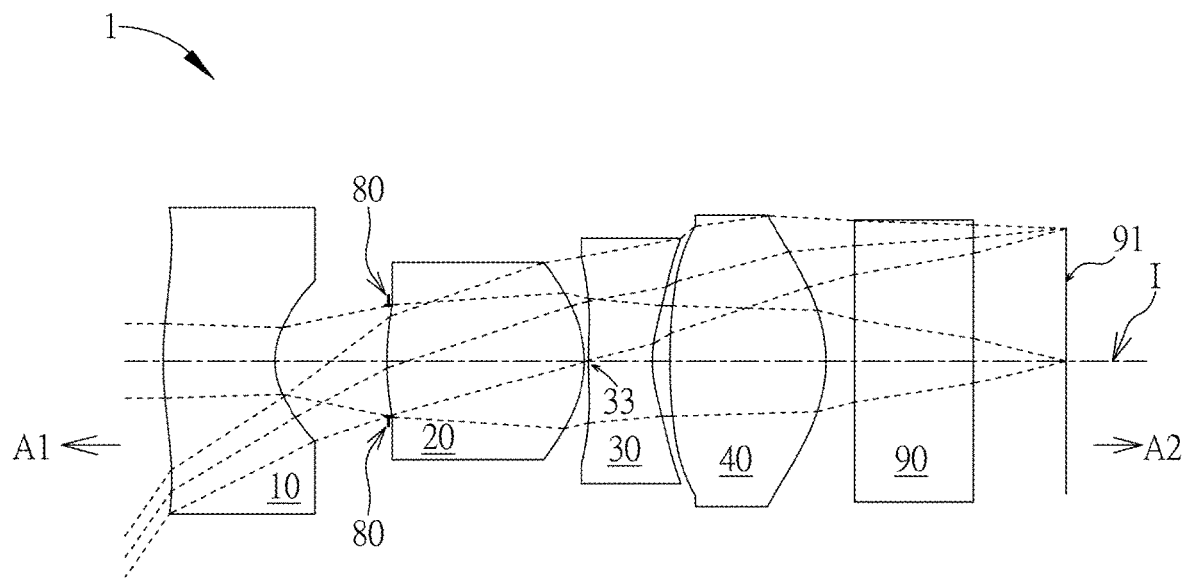
FIG. 18 illustrates a seventh embodiment of the optical imaging lens of the present invention.
Figures 19A, 19B, 19C, 19D:
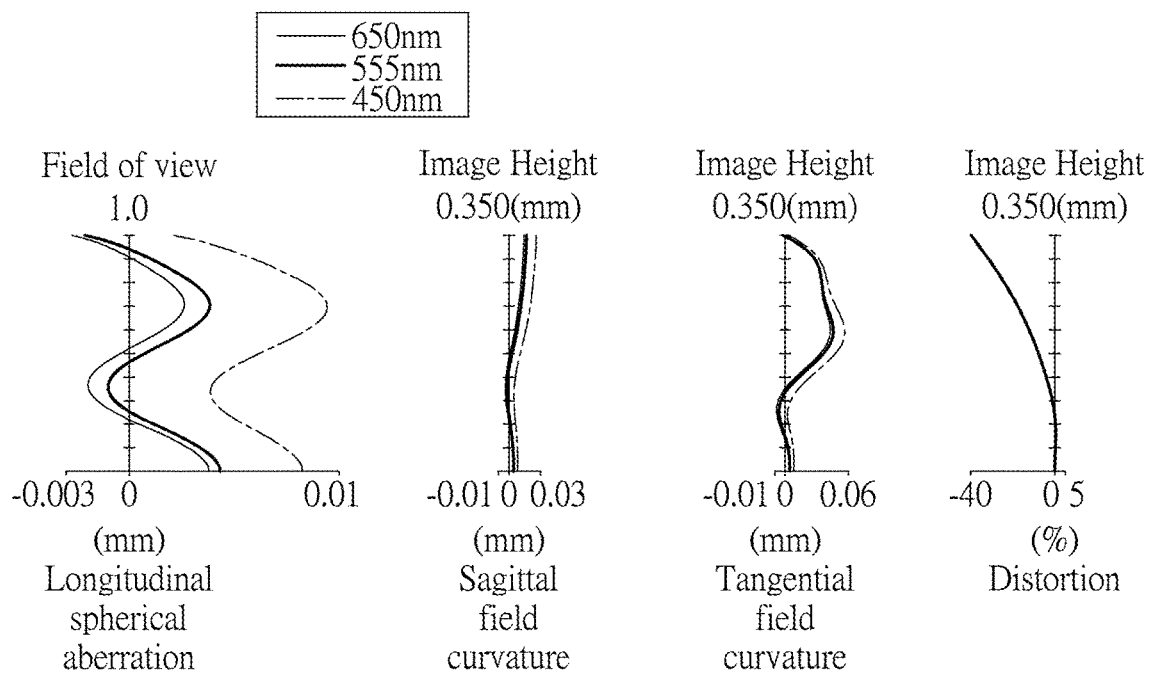
FIG. 19A illustrates the longitudinal spherical aberration on the image plane of the seventh embodiment.
FIG. 19B illustrates the field curvature aberration on the sagittal direction of the seventh embodiment.
FIG. 19C illustrates the field curvature aberration on the tangential direction of the seventh embodiment.
FIG. 19D illustrates the distortion aberration of the seventh embodiment.

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex.

The optical data of the seventh embodiment of the optical imaging lens are shown in FIG. 44 while the aspheric surface data are shown in FIG. 45. In this embodiment, EFL=0.406 mm; HFOV=55.011 degrees; TTL=2.387 mm; Fno=2.050; ImgH=0.350 mm. In particular: the distortion aberration of the optical imaging lens in this embodiment is better than that of the optical imaging lens in the first embodiment.

Eighth Embodiment

Figure 20:
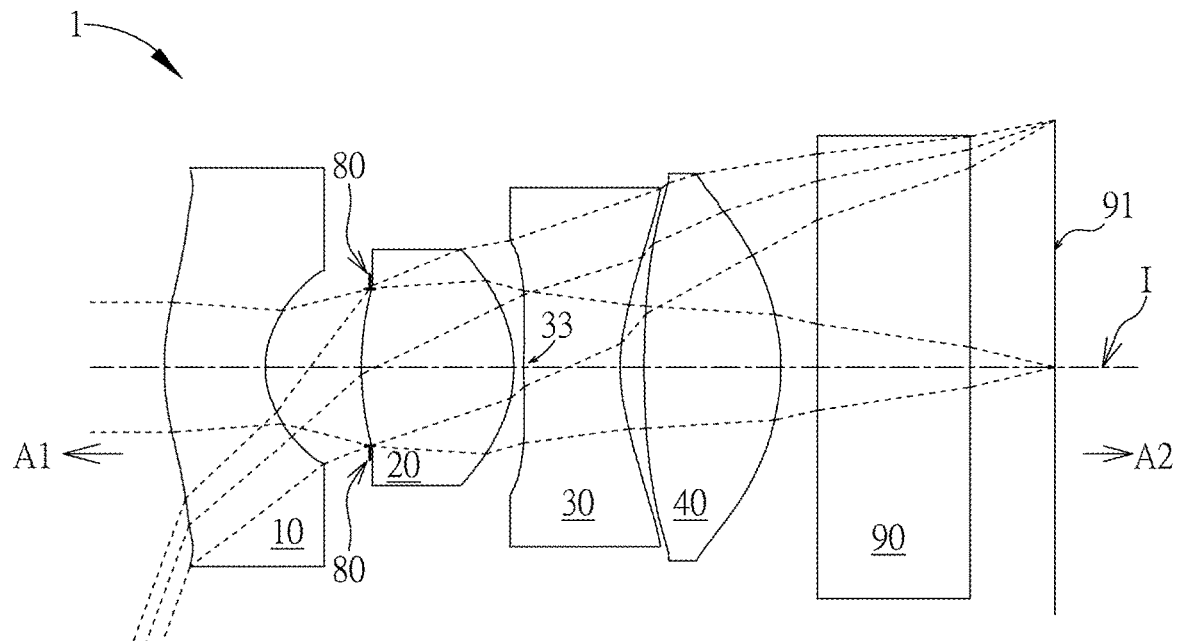
FIG. 20 illustrates an eighth embodiment of the optical imaging lens of the present invention.
Figures 21A, 21B, 21C, 21D:
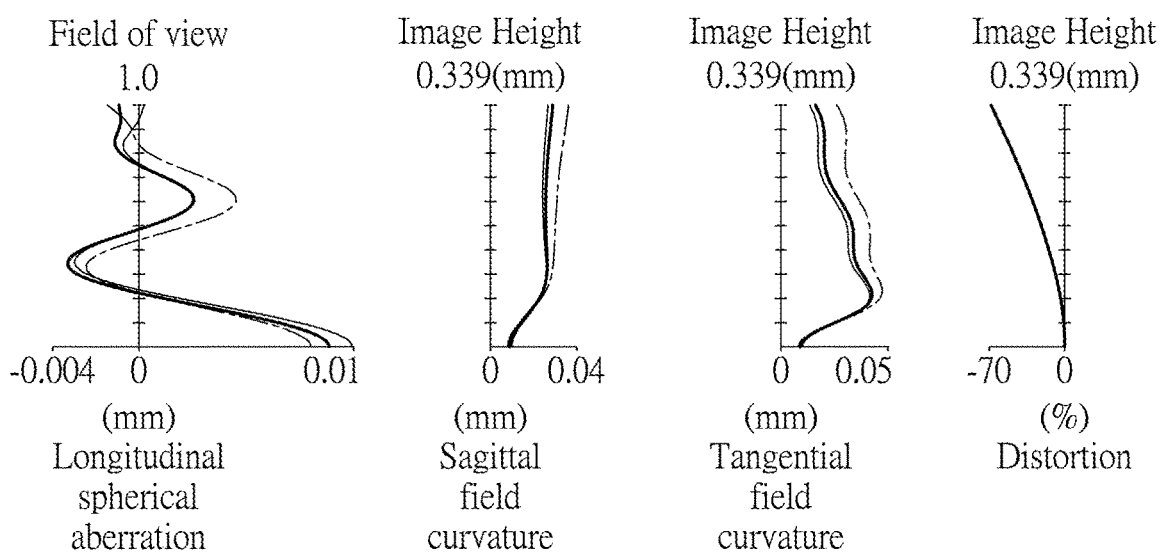
FIG. 21A illustrates the longitudinal spherical aberration on the image plane of the eighth embodiment.
FIG. 21B illustrates the field curvature aberration on the sagittal direction of the eighth embodiment.
FIG. 21C illustrates the field curvature aberration on the tangential direction of the eighth embodiment.
FIG. 21D illustrates the distortion aberration of the eighth embodiment.

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex.

The optical data of the eighth embodiment of the optical imaging lens are shown in FIG. 46 while the aspheric surface data are shown in FIG. 47. In this embodiment, EFL=0.391 mm; HFOV=70.000 degrees; TTL=1.225 mm; Fno=2.200; ImgH=0.339 mm.

Ninth Embodiment

Figure 22:
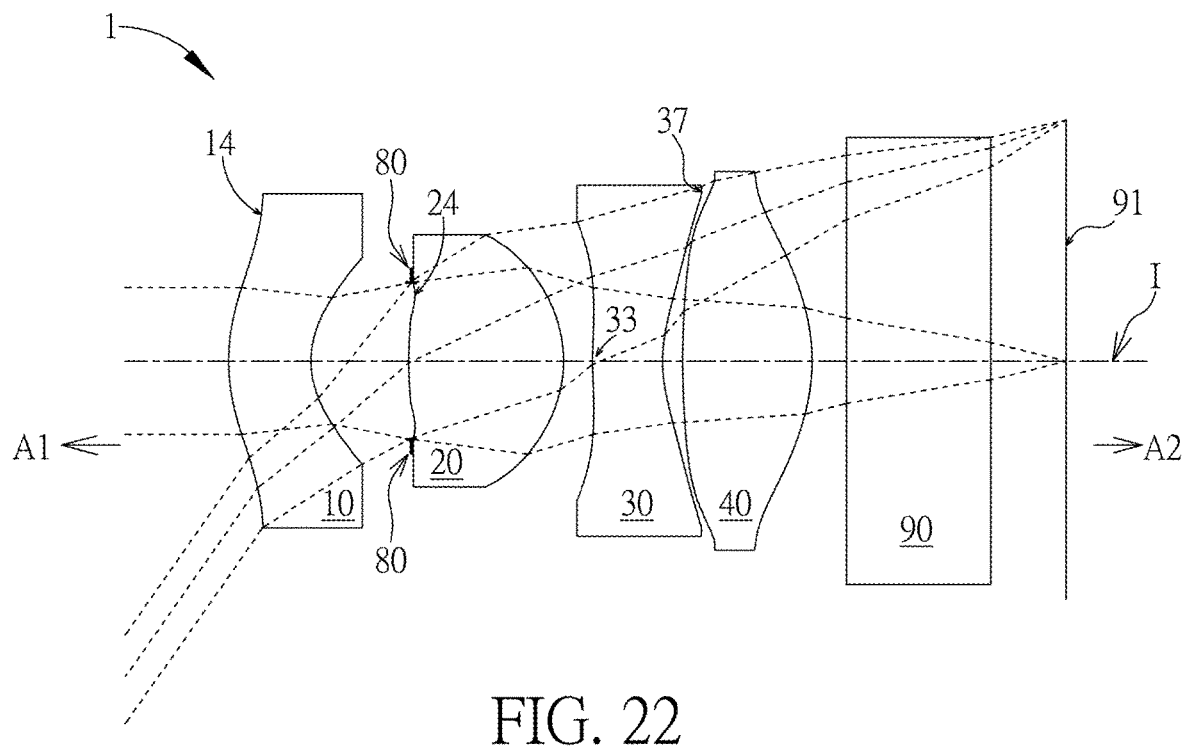
FIG. 22 illustrates a ninth embodiment of the optical imaging lens of the present invention.
Figures 23A, 23B, 23C, 23D:
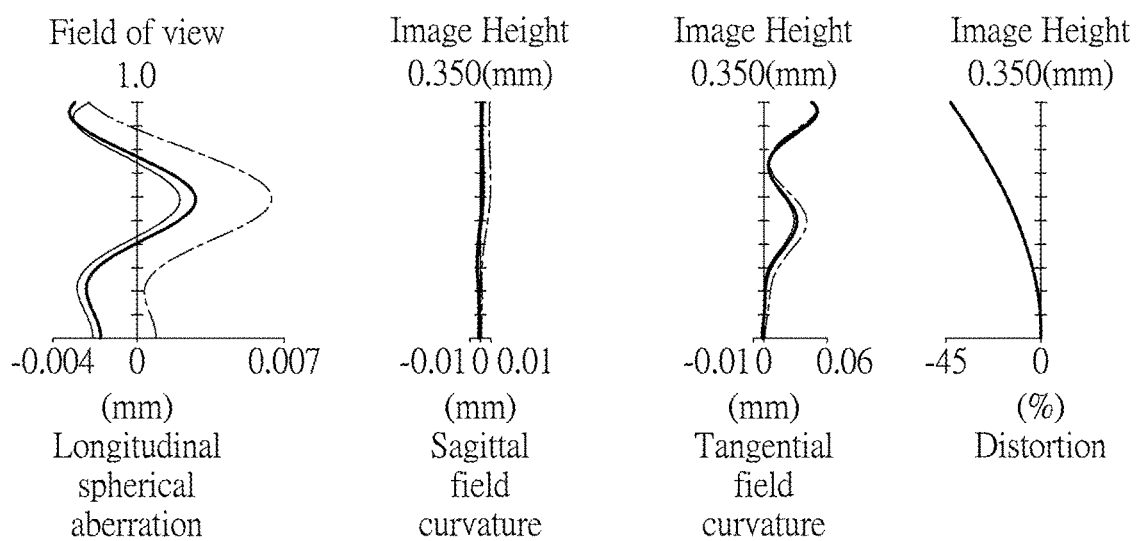
FIG. 23A illustrates the longitudinal spherical aberration on the image plane of the ninth embodiment.
FIG. 23B illustrates the field curvature aberration on the sagittal direction of the ninth embodiment.
FIG. 23C illustrates the field curvature aberration on the tangential direction of the ninth embodiment.
FIG. 23D illustrates the distortion aberration of the ninth embodiment.

Please refer to FIG. 22 which illustrates the ninth embodiment of the optical imaging lens 1 of the present invention. Please refer to FIG. 23A for the longitudinal spherical aberration on the image plane 91 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 14 of the object-side surface 11 of the first lens element 10 is convex, the periphery region 24 of the object-side surface 21 of the second lens element 20 is concave, the optical axis region 33 of the object-side surface 31 of the third lens element 30 is convex and the periphery region 37 of the image-side surface 32 of the third lens element 30 is convex.

The optical data of the ninth embodiment of the optical imaging lens are shown in FIG. 48 while the aspheric surface data are shown in FIG. 49. In this embodiment, EFL=0.428 mm; HFOV=54.989 degrees; TTL=1.217 mm; Fno=2.000; ImgH=0.350 mm. In particular: 1. the longitudinal spherical aberration of the optical imaging lens in this embodiment is better than that of the optical imaging lens in the first embodiment; 2. the distortion aberration of the optical imaging lens in this embodiment is better than that of the optical imaging lens in the first embodiment.

Tenth Embodiment

Figure 24:
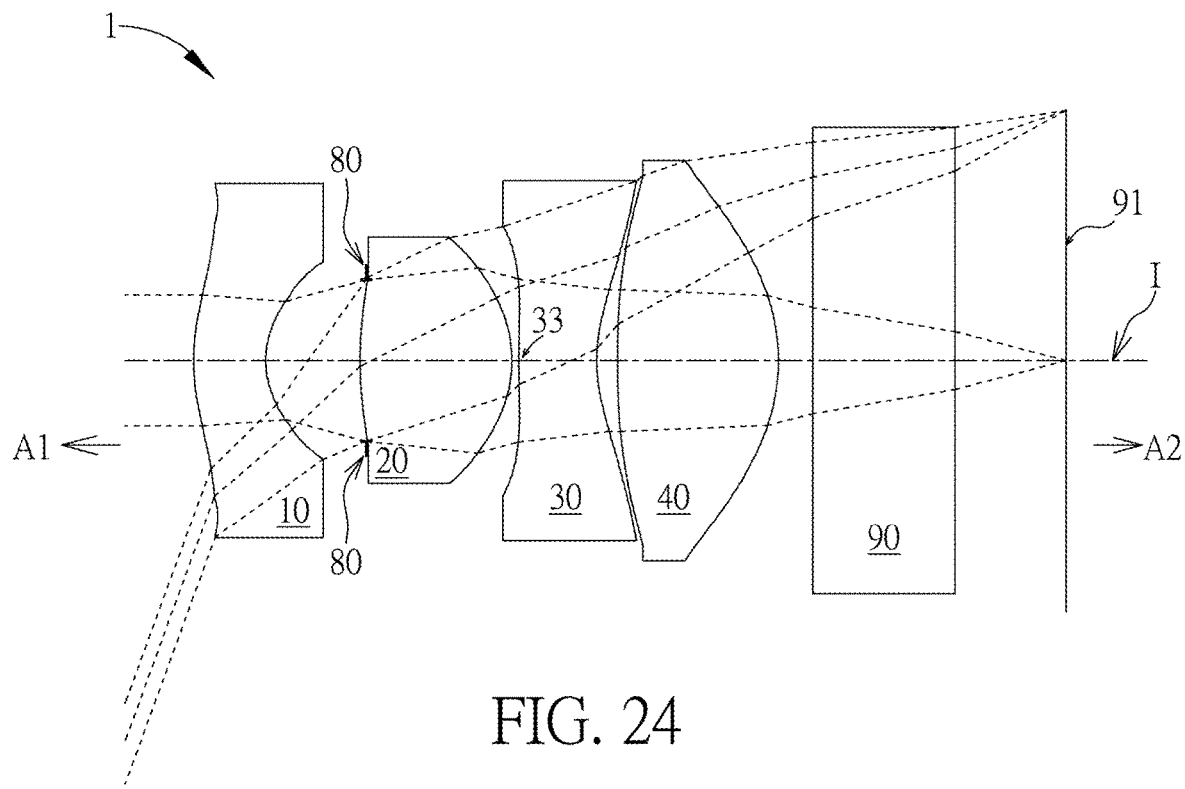
FIG. 24 illustrates a tenth embodiment of the optical imaging lens of the present invention.
Figures 25A, 25B, 25C, 25D:
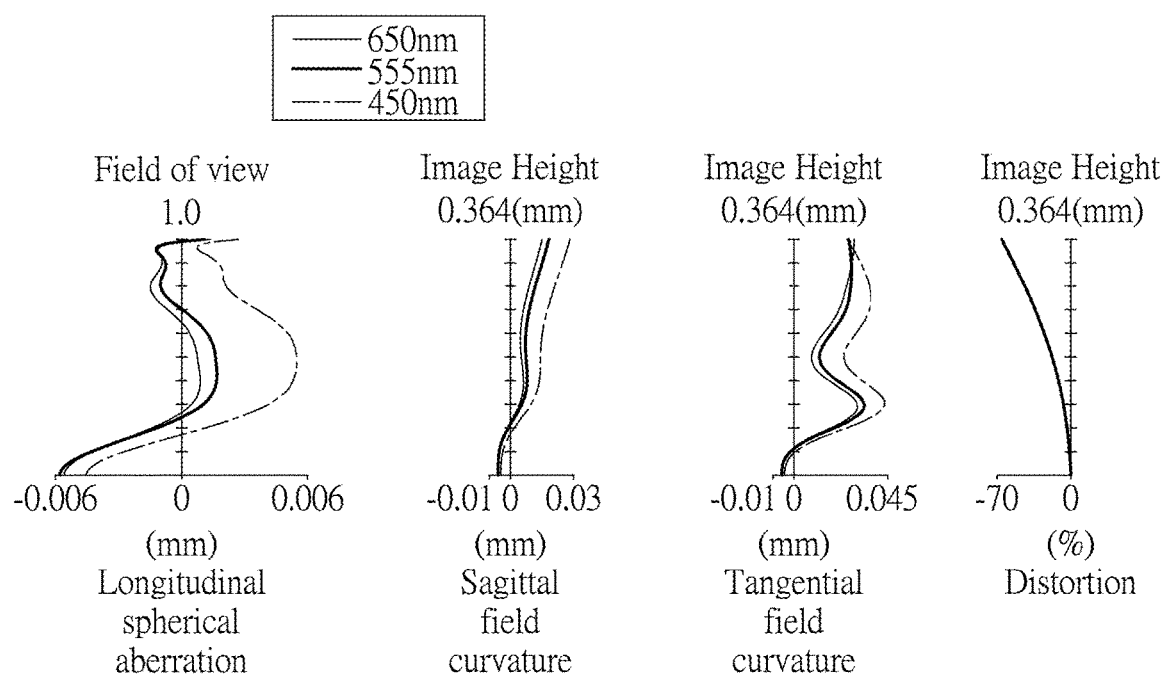
FIG. 25A illustrates the longitudinal spherical aberration on the image plane of the tenth embodiment.
FIG. 25B illustrates the field curvature aberration on the sagittal direction of the tenth embodiment.
FIG. 25C illustrates the field curvature aberration on the tangential direction of the tenth embodiment.
FIG. 25D illustrates the distortion aberration of the tenth embodiment.

Please refer to FIG. 24 which illustrates the tenth embodiment of the optical imaging lens 1 of the present invention. Please refer to FIG. 25A for the longitudinal spherical aberration on the image plane 91 of the tenth embodiment; please refer to FIG. 25B for the field curvature aberration on the sagittal direction; please refer to FIG. 25C for the field curvature aberration on the tangential direction, and please refer to FIG. 25D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex.

The optical data of the tenth embodiment of the optical imaging lens are shown in FIG. 50 while the aspheric surface data are shown in FIG. 51. In this embodiment, EFL=0.384 mm; HFOV=70.083 degrees; TTL=1.283 mm; Fno=2.000; ImgH=0.364 mm. In particular: the longitudinal spherical aberration of the optical imaging lens in this embodiment is better than that of the optical imaging lens in the first embodiment.

Eleventh Embodiment

Figure 26:
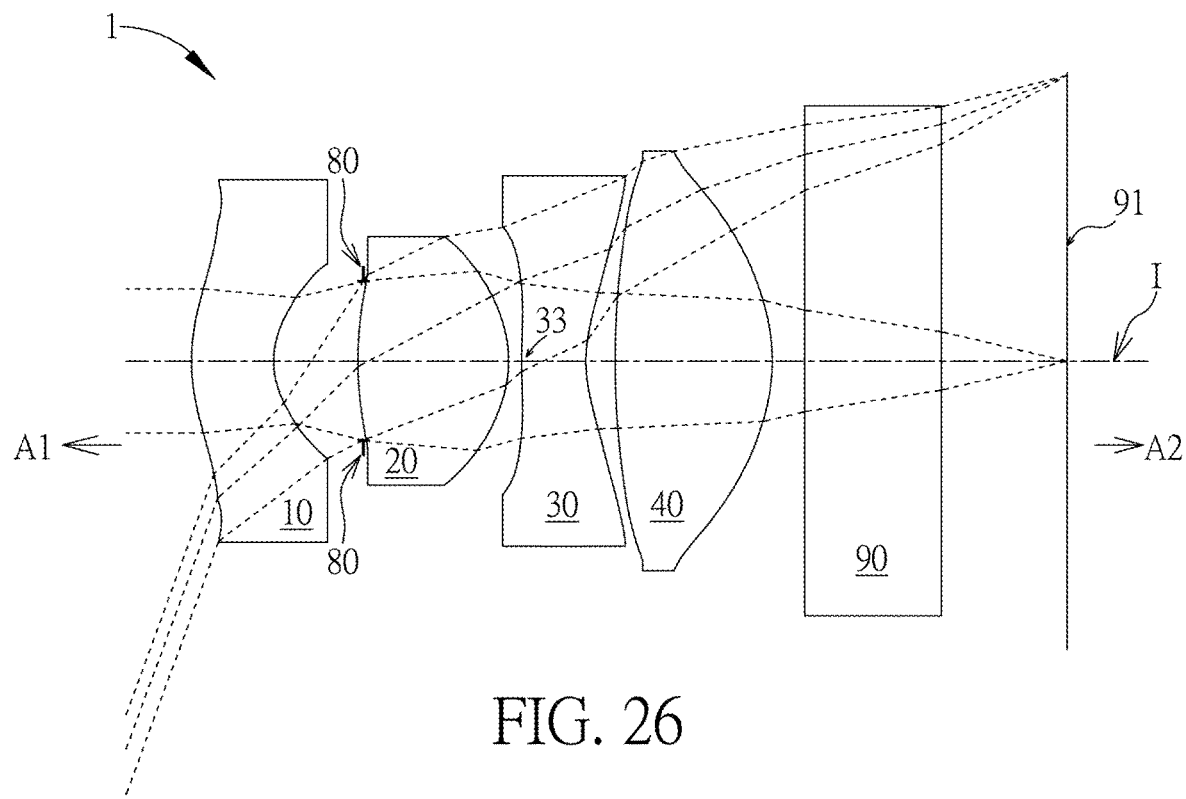
FIG. 26 illustrates an eleventh embodiment of the optical imaging lens of the present invention.
Figures 27A, 27B, 27C, 27D:
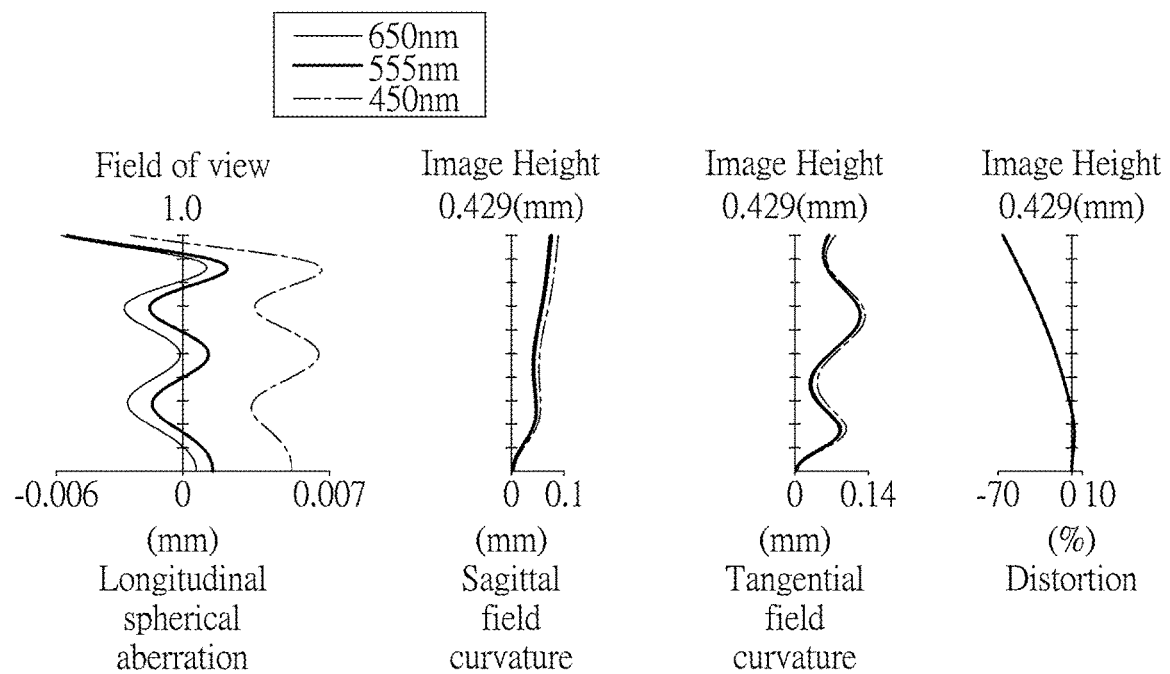
FIG. 27A illustrates the longitudinal spherical aberration on the image plane of the eleventh embodiment.
FIG. 27B illustrates the field curvature aberration on the sagittal direction of the eleventh embodiment.
FIG. 27C illustrates the field curvature aberration on the tangential direction of the eleventh embodiment.
FIG. 27D illustrates the distortion aberration of the eleventh embodiment.

Please refer to FIG. 26 which illustrates the eleventh embodiment of the optical imaging lens 1 of the present invention. Please refer to FIG. 27A for the longitudinal spherical aberration on the image plane 91 of the eleventh embodiment; please refer to FIG. 27B for the field curvature aberration on the sagittal direction; please refer to FIG. 27C for the field curvature aberration on the tangential direction, and please refer to FIG. 27D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex.

The optical data of the eleventh embodiment of the optical imaging lens are shown in FIG. 52 while the aspheric surface data are shown in FIG. 53. In this embodiment, EFL=0.454 mm; HFOV=70.035 degrees; TTL=1.343 mm; Fno=2.050; ImgH=0.429 mm. In particular: the longitudinal spherical aberration of the optical imaging lens in this embodiment is better than that of the optical imaging lens in the first embodiment.

Twelfth Embodiment

Please refer to FIG. 28 which illustrates the twelfth embodiment of the optical imaging lens 1 of the present invention. Please refer to FIG. 29A for the longitudinal spherical aberration on the image plane 91 of the twelfth embodiment; please refer to FIG. 29B for the field curvature aberration on the sagittal direction; please refer to FIG. 29C for the field curvature aberration on the tangential direction, and please refer to FIG. 29D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the third lens element 30 has positive refracting power, the optical axis region 33 and the periphery region 34 of the object-side surface 31 of the third lens element 30 are convex, the fourth lens element 40 has negative refracting power and the optical axis region 46 and the periphery region 47 of the image-side surface 42 of the fourth lens element 40 are concave.

The optical data of the twelfth embodiment of the optical imaging lens are shown in FIG. 54 while the aspheric surface data are shown in FIG. 55. In this embodiment, EFL=0.415 mm; HFOV=54.926 degrees; TTL=1.032 mm; Fno=2.000; ImgH=0.343 mm. In particular: the distortion aberration of the optical imaging lens in this embodiment is better than that of the optical imaging lens in the first embodiment.

Thirteenth Embodiment

Figure 30:
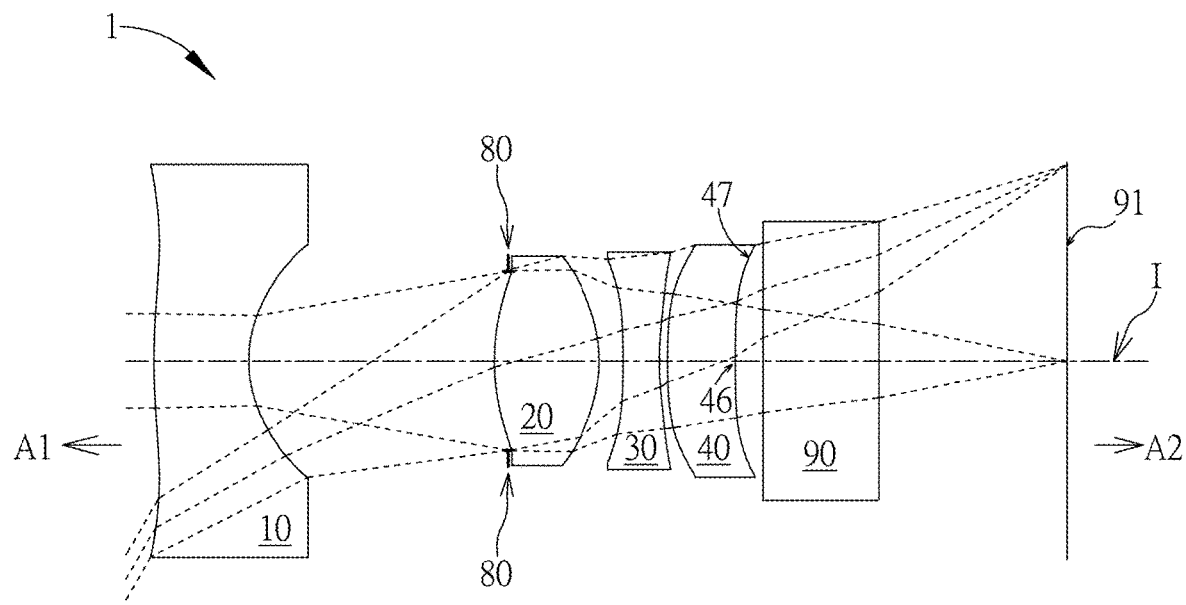
FIG. 30 illustrates a thirteenth embodiment of the optical imaging lens of the present invention.
Figures 31A, 31B, 31C, 31D:
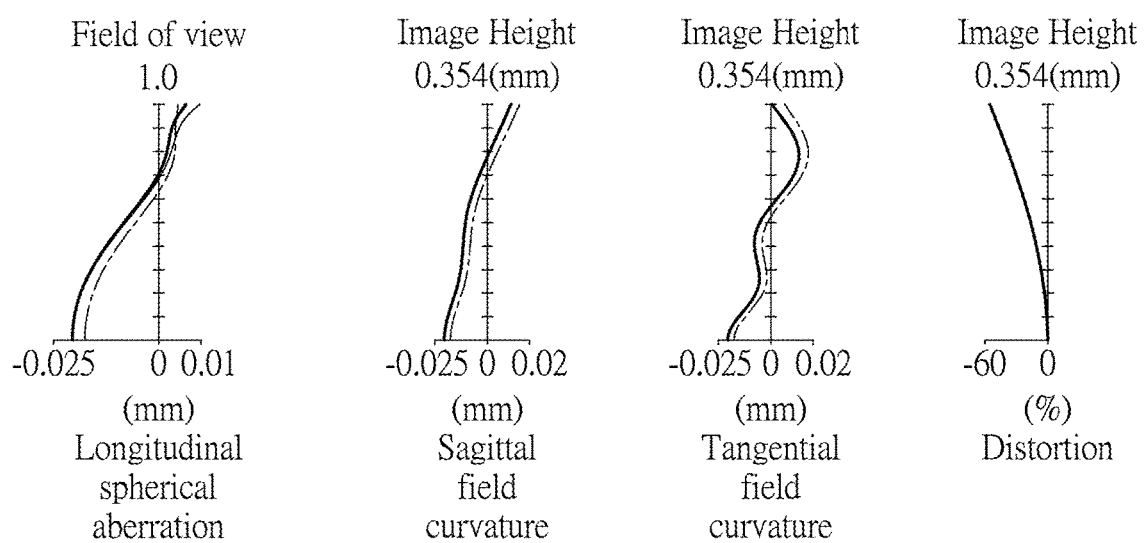
FIG. 31A illustrates the longitudinal spherical aberration on the image plane of the thirteenth embodiment.
FIG. 31B illustrates the field curvature aberration on the sagittal direction of the thirteenth embodiment.
FIG. 31C illustrates the field curvature aberration on the tangential direction of the thirteenth embodiment.
FIG. 31D illustrates the distortion aberration of the thirteenth embodiment.

Please refer to FIG. 30 which illustrates the thirteenth embodiment of the optical imaging lens 1 of the present invention. Please refer to FIG. 31A for the longitudinal spherical aberration on the image plane 91 of the thirteenth embodiment; please refer to FIG. 31B for the field curvature aberration on the sagittal direction; please refer to FIG. 31C for the field curvature aberration on the tangential direction, and please refer to FIG. 31D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 46 and the periphery region 47 of the image-side surface 42 of the fourth lens element 40 are concave.

The optical data of the thirteenth embodiment of the optical imaging lens are shown in FIG. 56 while the aspheric surface data are shown in FIG. 57. In this embodiment, EFL=0.442 mm; HFOV=60.021 degrees; TTL=1.649 mm; Fno=2.448; ImgH=0.354 mm.

Some important parameter and ratios in each embodiment are shown in FIG. 58 and in FIG. 59.

The embodiments of the present invention have the following advantageous efficacy:

1. When the optical axis region of the object-side surface of the second lens element is convex, the optical axis region of the image-side surface of the third lens element is concave, Tavg≤350 μm, and Gmax/Tmin≥1.000, the combination of the surface shapes and the thicknesses to go with the air gaps may effectively improve the distortion and the aberration of the entire optical imaging lens so that the optical imaging lens of the present invention may have good optical performance. The further satisfaction of Tmax−T2≤λ may reduce the size of the optical imaging lens to reach the purpose of thinning. Notably, λ=0 when T2=Tmax, and λ=90 μm if T2≠Tmax. The preferable range of Tavg may be 100 μm≤Tavg≤350 μm, and the preferable range of Gmax/Tmin may be 1.000≤Gmax/Tmin≤7.400.

2. When the first lens element has negative refracting power and an optical axis region of the object-side surface of the first lens element is convex, the field of view of the optical imaging lens may be enlarged. The further limitations to go with that the optical axis region of the image-side surface of the third lens element is concave and Tavg≤400 μm may correct the aberration so that the optical imaging lens may have good optical performance. The further satisfaction of Tmax−T2≤λ and T3−Tmin≤δ may effectively reduce the size of the optical imaging lens to satisfy the purpose of thinning. Notably, λ=0 when T2=Tmax, λ=90 μm if T2≠Tmax, δ=0 when T3=Tmin, and δ=150 μm if T3=Tmin, and the preferable range of Tavg may be 100 μm≤Tavg≤400 μm.

3. When the optical axis region of the object-side surface of the first lens element is convex, the optical axis region of the image-side surface of the third lens element is concave and |υ1−υ2|≤30.000, the combinations of the surface shapes and the materials may make the field of view of the optical imaging lens to be enlarged, the local aberration corrected and the chromatic aberration improved. The further control of Tavg≤300 μm may effectively reduce the size of the optical imaging lens to reach the purpose of thinning. The preferable range of |υ1−υ2| may be 0.000≤|υ1−υ2|≤30.000, and the preferable range of Tavg may be 100 μm≤Tavg≤300 μm.

4. When the lens satisfies υ1+υ2≥93.000 and υ3+υ4≥70.000, it is beneficial to the transmission and deflection of imaging rays and to further improve the chromatic aberration so that the optical imaging lens may have excellent imaging quality. The preferable range of υ1+υ2 may be 93.000≤υ1+υ2≤120.000, and the preferable range of υ3+υ4 may be 70.000≤υ3+υ4≤83.500.

5. To ensure the thinning of the optical imaging lens, it may have better optical performance when G12<ALT is met.

6. When Fno or HFOV satisfies the following proportional relationships, it is beneficial to reduce the f-number to increase the luminous flux of the optical imaging lens or to enlarge the field of view, so that the present invention may have better optical quality:
A) HFOV/(TTL+EFL)≥18.000 degrees/mm, and the preferable range is 18.000 degrees/mm≤HFOV/(TTL+EFL)≤47.500 degrees/mm;
B) HFOV/Fno≥18.500 degrees, and the preferable range is 18.500 degrees≤HFOV/Fno≤38.500 degrees.

7. When the resolution and the system length of the optical imaging lens are taken into consideration, the present invention may compromise between the pixels and the resolution while the purpose of thinning may be satisfied when TTL/ImgH≥3.000 to maintain the good imaging quality of the present invention. The preferable range is 3.000≤TTL/ImgH≤8.900.

8. In order to shorten the system length of the optical imaging lens and to ensure the imaging quality, the air gaps between lens elements or lens thicknesses may be adjusted appropriately or kept in suitable ratios or EFL, BFL, the air gaps between lens elements or lens element thicknesses may be suitably combined or designed, but the difficulty of manufacturing and the imaging quality must be taken into consideration at the same time. Therefore, if the numerical limits of the following relationships are satisfied, the embodiments of the present invention may have better configurations:

TTL/T2≤8.700, the preferable range is 4.200≤TTL/T2≤8.700;

AAG/Tmin≤7.700, the preferable range is 1.200≤AAG/Tmin≤7.700;

EFL/(G23+T3+G34)≥1.490, the preferable range is 1.490≤EFL/(G23+T3+G34)≤8.600;
(ALT+EFL)/(G12+T3+T4)≤3.200, the preferable range is 1.200≤(ALT+EFL)/(G12+T3+T4)≤3.200;
EFL/Gmax≤3.500, the preferable range is 0.700≤EFL/Gmax≤3.500;
TL/(G12+T4)≤2.700, the preferable range is 1.700≤TL/(G12+T4)≤2.700;
AAG/T1≤3.500, the preferable range is 0.850≤AAG/T1≤3.500;
(EFL+BFL)/(T1+T4)≤3.700, the preferable range is 1.400≤(EFL+BFL)/(T1+T4)≤3.700;
BFL/(G12+G34)≤2.900, the preferable range is 0.850≤BFL/(G12+G34)≤2.900;
TL/(G12+G34)≤5.100, the preferable range is 2.100≤TL/(G12+G34)≤5.100;
ALT/(T1+G34)≤5.000, the preferable range is 1.900≤ALT/(T1+G34)≤5.000;
BFL/(G23+T4)≥1.500, the preferable range is 1.500≤BFL/(G23+T4)≤3.900;
(ALT+BFL)/(AAG+EFL)≥0.900, the preferable range is 0.900≤(ALT+BFL)/(AAG+EFL)≤2.900;
(TTL+EFL)/(Tmax+Tmax2)≤5.850, the preferable range is 2.700≤(TTL+EFL)/(Tmax+Tmax2)≤5.850.

Any arbitrary combination of the parameters of the embodiments can be selected additionally to increase the lens limitation so as to facilitate the design of the same structure of the present invention.

In the light of the unpredictability of the optical imaging lens, the above conditional formulas preferably suggest the above principles to have a shorter system length of the optical imaging lens, an enlarged field of view, better imaging quality or a better fabrication yield to overcome the drawbacks of prior art. Some of the lens elements in the embodiments of the present invention may be made of a plastic material to reduce the weight of the optical imaging lens and to reduce the production cost.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:
(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.
(2) The comparative relation between the optical parameters is that A is greater than B or A is less than B, for example.
(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element and a fourth lens element, the first lens element to the fourth lens element each having an object-side surface facing toward the object side and allowing imaging rays to pass through as well as an image-side surface facing toward the image side and allowing the imaging rays to pass through, the optical imaging lens comprising:
the first lens element has negative refracting power;
the second lens element has positive refracting power and an optical axis region of the object-side surface of the second lens element is convex;
an optical axis region of the image-side surface of the third lens element is concave; and
lens elements included by the optical imaging lens are only the four lens elements described above;
wherein Tavg is an average of four thicknesses from the first lens element to the fourth lens element along the optical axis, HFOV is a half field of view of the optical imaging lens, Fno is a f-number of the optical imaging lens, Gmax is the largest value of three air gaps from the first lens element to the fourth lens element along the optical axis, Tmax is the largest thickness of four lens elements from the first lens element to the fourth lens element along the optical axis, Tmin is the smallest thickness of four lens elements from the first lens element to the fourth lens element along the optical axis, and T2 is a thickness of the second lens element along the optical axis to satisfy:
HFOV/Fno≥18.500 degrees, Tavg≤350 μm, Gmax/Tmin≥1.000, Tmax−T2≤λ; λ=0 when T2=Tmax, and λ=90 μm if T2≠Tmax.

2. The optical imaging lens of claim 1, wherein TTL is a distance from the object-side surface of the first lens element to an image plane along the optical axis, and the optical imaging lens satisfies the relationship: TTL/T2≤8.700.

3. The optical imaging lens of claim 1, wherein AAG is a sum of three air gaps from the first lens element to the fourth lens element along the optical axis, and the optical imaging lens satisfies the relationship: AAG/Tmin≤7.700.

4. The optical imaging lens of claim 1, wherein EFL is an effective focal length of the optical imaging lens, T3 is a thickness of the third lens element along the optical axis, G23 is an air gap between the second lens element and the third lens element along the optical axis and G34 is an air gap between the third lens element and the fourth lens element along the optical axis, and the optical imaging lens satisfies the relationship: EFL/(G23+T3+G34)≥1.490.

5. The optical imaging lens of claim 1, wherein ALT is a sum of thicknesses of all the four lens elements along the optical axis, EFL is an effective focal length of the optical imaging lens, T3 is a thickness of the third lens element along the optical axis, T4 is a thickness of the fourth lens element along the optical axis and G12 is an air gap between the first lens element and the second lens element along the optical axis, and the optical imaging lens satisfies the relationship:
(ALT+EFL)/(G12+T3+T4)≤3.200.

6. The optical imaging lens of claim 1, wherein EFL is an effective focal length of the optical imaging lens, and the optical imaging lens satisfies the relationship: EFL/Gmax≤3.500.

7. The optical imaging lens of claim 1, wherein TTL is a distance from the object-side surface of the first lens element to an image plane along the optical axis and EFL is an effective focal length of the optical imaging lens, and the optical imaging lens satisfies the relationship: HFOV/(TTL+EFL)≥18.000 degrees/mm.

8. An optical imaging lens, from an object side to an image side in order along an optical axis comprising: a first lens element, a second lens element, a third lens element and a fourth lens element, the first lens element to the fourth lens element each having an object-side surface facing toward the object side and allowing imaging rays to pass through as well as an image-side surface facing toward the image side and allowing the imaging rays to pass through, the optical imaging lens comprising:
the first lens element has negative refracting power and an optical axis region of the object-side surface of the first lens element is convex;
the second lens element has positive refracting power;
an optical axis region of the image-side surface of the third lens element is concave; and
lens elements included by the optical imaging lens are only the four lens elements described above;
wherein Tavg is an average of four thicknesses from the first lens element to the fourth lens element along the optical axis, Tmax is the largest thickness of four lens elements from the first lens element to the fourth lens element along the optical axis, Tmin is the smallest thickness of four lens elements from the first lens element to the fourth lens element along the optical axis, HFOV is a half field of view of the optical imaging lens, Fno is a f-number of the optical imaging lens, T2 is a thickness of the second lens element along the optical axis and T3 is a thickness of the third lens element along the optical axis to satisfy: HFOV/Fno≥18.500 degrees, avg≤400 μm, Tmax−T2≤λ, T3−Tmin≤δ; λ=0 when T2=Tmax, λ=90 μm if T2≠Tmax, δ=0 when T3=Tmin, and δ=150 μm if T3≠Tmin.

9. The optical imaging lens of claim 8, wherein TL is a distance from the object-side surface of the first lens element to the image-side surface of the fourth lens element along the optical axis, T4 is a thickness of the fourth lens element along the optical axis and G12 is an air gap between the first lens element and the second lens element along the optical axis, and the optical imaging lens satisfies the relationship:
TL/(G12+T4)≤2.700.

10. The optical imaging lens of claim 8, wherein AAG is a sum of three air gaps from the first lens element to the fourth lens element along the optical axis and T1 is a thickness of the first lens element along the optical axis, and the optical imaging lens satisfies the relationship: AAG/T1≤3.500.

11. The optical imaging lens of claim 8, wherein EFL is an effective focal length of the optical imaging lens, BFL is a distance from the image-side surface of the fourth lens element to an image plane along the optical axis, T1 is a thickness of the first lens element along the optical axis and T4 is a thickness of the fourth lens element along the optical axis, and the optical imaging lens satisfies the relationship:
(EFL+BFL)/(T1+T4)≤3.700.

12. The optical imaging lens of claim 8, wherein υ3 is an Abbe number of the third lens element and υ4 is an Abbe number of the fourth lens element, and the optical imaging lens satisfies the relationship: υ3+υ4≥70.000.

13. The optical imaging lens of claim 8, wherein BFL is a distance from the image-side surface of the fourth lens element to an image plane along the optical axis, G12 is an air gap between the first lens element and the second lens element along the optical axis and G34 is an air gap between the third lens element and the fourth lens element along the optical axis, and the optical imaging lens satisfies the relationship:
BFL/(G12+G34)≤2.900.

14. An optical imaging lens, from an object side to an image side in order along an optical axis comprising: a first lens element, a second lens element, a third lens element and a fourth lens element, the first lens element to the fourth lens element each having an object-side surface facing toward the object side and allowing imaging rays to pass through as well as an image-side surface facing toward the image side and allowing the imaging rays to pass through, the optical imaging lens comprising:
the first lens element has negative refracting power and an optical axis region of the object-side surface of the first lens element is convex;
the second lens element has positive refracting power;
an optical axis region of the image-side surface of the third lens element is concave; and
lens elements included by the optical imaging lens are only the four lens elements described above;
wherein HFOV is a half field of view of the optical imaging lens, Fno is a f-number of the optical imaging lens, Tavg is an average of four thicknesses from the first lens element to the fourth lens element along the optical axis, an Abbe number of the first lens element is υ1, and an Abbe number of the second lens element is υ2 to satisfy:
HFOV/Fno≥18.500 degrees, Tavg≤300 μm, and |υ1−υ2|≤30.000.

15. The optical imaging lens of claim 14, wherein TL is a distance from the object-side surface of the first lens element to the image-side surface of the fourth lens element along the optical axis, G12 is an air gap between the first lens element and the second lens element along the optical axis and G34 is an air gap between the third lens element and the fourth lens element along the optical axis and the optical imaging lens satisfies the relationship: TL/(G12+G34) ≤5.100.

16. The optical imaging lens of claim 14, wherein ALT is a sum of thicknesses of all the four lens elements along the optical axis, T1 is a thickness of the first lens element along the optical axis and G34 is an air gap between the third lens element and the fourth lens element along the optical axis and the optical imaging lens satisfies the relationship: ALT/(T1+G34)≤5.000.

17. The optical imaging lens of claim 14, wherein BFL is a distance from the image-side surface of the fourth lens element to an image plane along the optical axis, T4 is a thickness of the fourth lens element along the optical axis and G23 is an air gap between the second lens element and the third lens element along the optical axis, and the optical imaging lens satisfies the relationship: BFL/(G23+T4) ≥1.500.

18. The optical imaging lens of claim 14, wherein TTL is a distance from the object-side surface of the first lens element to an image plane along the optical axis and ImgH is an image height of the optical imaging lens, and the optical imaging lens satisfies the relationship: TTL/ImgH≥3.000.

19. The optical imaging lens of claim 14, wherein ALT is a sum of thicknesses of all the four lens elements along the optical axis, BFL is a distance from the image-side surface of the fourth lens element to an image plane along the optical axis, AAG is a sum of three air gaps from the first lens element to the fourth lens element along the optical axis and EFL is an effective focal length of the optical imaging lens, and the optical imaging lens satisfies the relationship:

(ALT+BFL)/(AAG+EFL)≥0.900.

* * * * *